(12) United States Patent
Koito et al.

(10) Patent No.: US 10,268,070 B2
(45) Date of Patent: Apr. 23, 2019

(54) DISPLAY DEVICE INCORPORATING REFLECTIVE AND RETROREFLECTIVE ELEMENTS

(71) Applicant: Japan Display Inc., Tokyo (JP)

(72) Inventors: Takeo Koito, Tokyo (JP); Yudai Numata, Tokyo (JP)

(73) Assignee: Japan Display Inc., Tokyo (JP)

( * ) Notice: Subject to any disclaimer, the term of this patent is extended or adjusted under 35 U.S.C. 154(b) by 10 days.

(21) Appl. No.: 15/478,579

(22) Filed: Apr. 4, 2017

(65) Prior Publication Data

US 2017/0285402 A1   Oct. 5, 2017

(30) Foreign Application Priority Data

Apr. 5, 2016 (JP) ................. 2016-075789

(51) Int. Cl.
| | |
|---|---|
| *G02F 1/1335* | (2006.01) |
| *G02B 5/12* | (2006.01) |
| *G02B 5/124* | (2006.01) |
| *G02B 5/128* | (2006.01) |
| *G02B 27/22* | (2018.01) |
| *G02F 1/13363* | (2006.01) |

(52) U.S. Cl.
CPC ......... *G02F 1/133553* (2013.01); *G02B 5/12* (2013.01); *G02B 5/124* (2013.01); *G02B 5/128* (2013.01); *G02B 27/2292* (2013.01); *G02F 1/13363* (2013.01)

(58) Field of Classification Search
CPC .......... G02F 1/133553; G02F 1/13363; G02F 2001/133638; G02B 5/12; G02B 5/3083; G02B 5/08; G02B 5/124; G02B 27/0018

USPC .......... 359/485.01, 489.07, 530, 614; 349/96
See application file for complete search history.

(56) References Cited

U.S. PATENT DOCUMENTS

| | | | | |
|---|---|---|---|---|
| 3,709,580 A | * | 1/1973 | Fugitt | G02B 23/22 359/488.01 |
| 4,107,522 A | * | 8/1978 | Walter | G01V 8/18 250/221 |
| 5,061,050 A | * | 10/1991 | Ogura | G02B 5/3033 359/487.04 |
| 5,422,756 A | * | 6/1995 | Weber | G02B 5/124 359/485.03 |

(Continued)

FOREIGN PATENT DOCUMENTS

| | | |
|---|---|---|
| JP | 2011-253128 A | 12/2011 |
| JP | 2015-040944 A | 3/2015 |

OTHER PUBLICATIONS

Machine language translation of JP Publication No. 2011-253128 (published Dec. 15, 2011) from https://www4.j-platpat.inpit.go.jp/cgi-bin/tran_web_cgi_ejje?u=http://www4.j-platpat.inpit.go.jp/eng/translation/201802010559469231734316561454691 9CEC0E14FEC22421C5A34C99E6D7FC18E. Downloaded Jan. 31, 2018.*

*Primary Examiner* — Frank G Font
(74) *Attorney, Agent, or Firm* — Michael Best & Friedrich LLP

(57) ABSTRACT

According to one embodiment, a display device includes an optical element which transmits or reflects incident light, and a first reflective element including a first reflective portion and a second reflective portion. The first reflective portion retroreflects reflective light reflected on the optical element. The second reflective portion has an area less than an area of the first reflective portion and regularly reflects the reflective light.

19 Claims, 20 Drawing Sheets

(56) References Cited

U.S. PATENT DOCUMENTS

| | | | | |
|---|---|---|---|---|
| 5,559,634 A * | 9/1996 | Weber | ............... | G02B 5/124 |
| | | | | 359/485.04 |
| 5,726,806 A * | 3/1998 | Holden | ............ | G02B 27/01 |
| | | | | 359/630 |
| 5,764,411 A * | 6/1998 | Shanks | .......... | G02B 27/2292 |
| | | | | 359/485.02 |
| 5,861,993 A * | 1/1999 | Shanks | ............ | G02B 5/124 |
| | | | | 359/629 |
| 2015/0248014 A1* | 9/2015 | Powell | ............ | G02B 3/0006 |
| | | | | 349/10 |
| 2017/0242173 A1* | 8/2017 | Numata | ............... | G02B 5/08 |
| 2017/0285359 A1* | 10/2017 | Numata | ............ | G02B 5/124 |

* cited by examiner

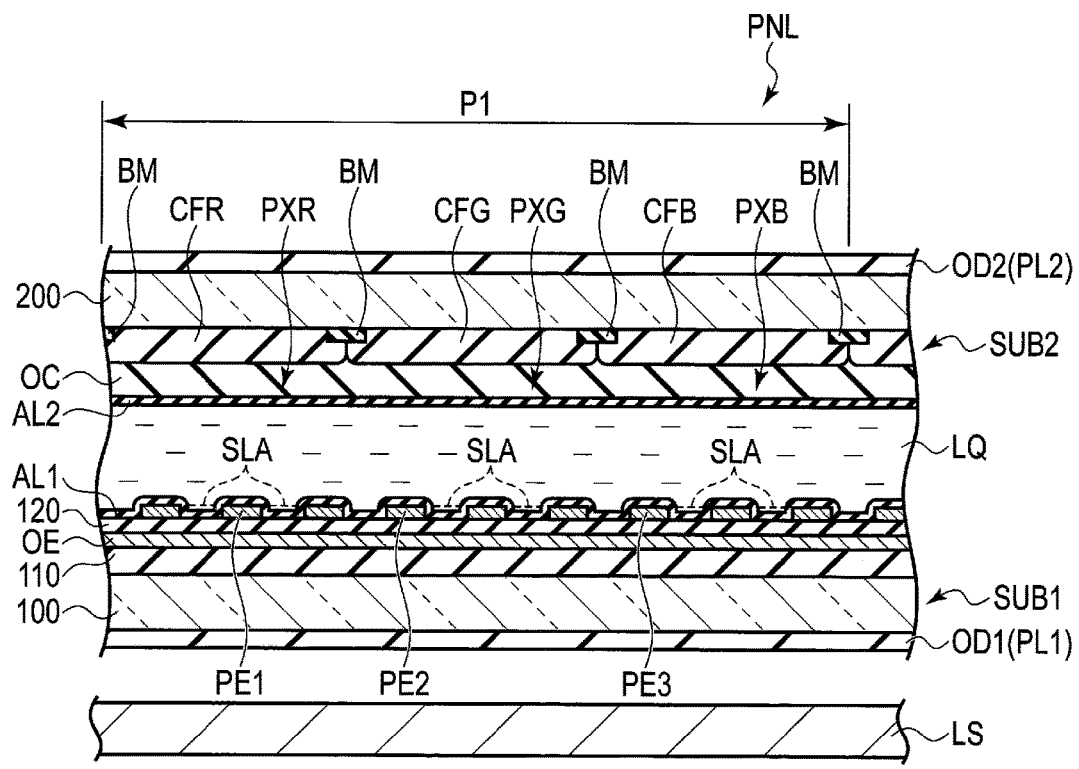
F I G. 5
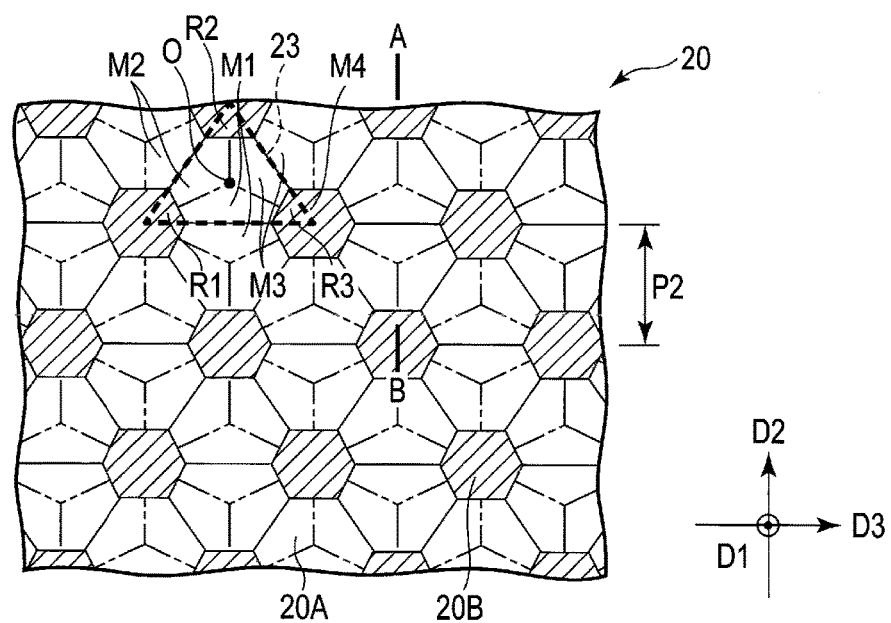
F I G. 6

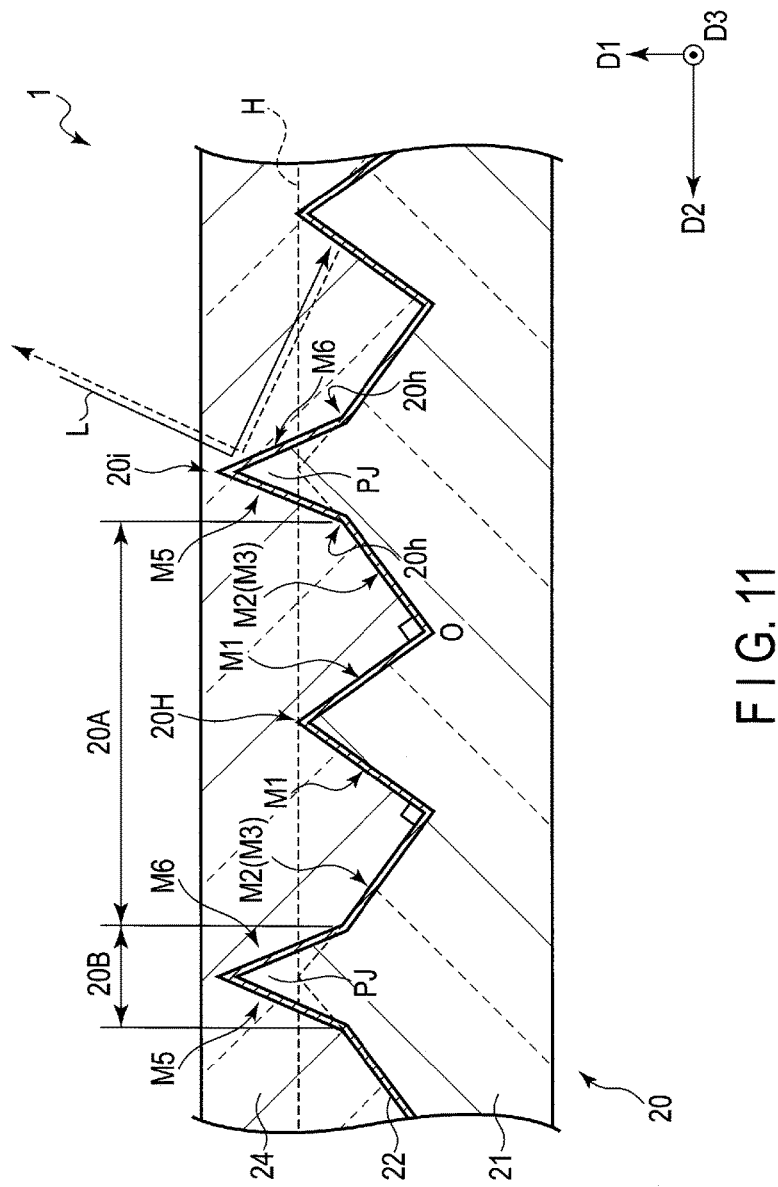
F I G. 11

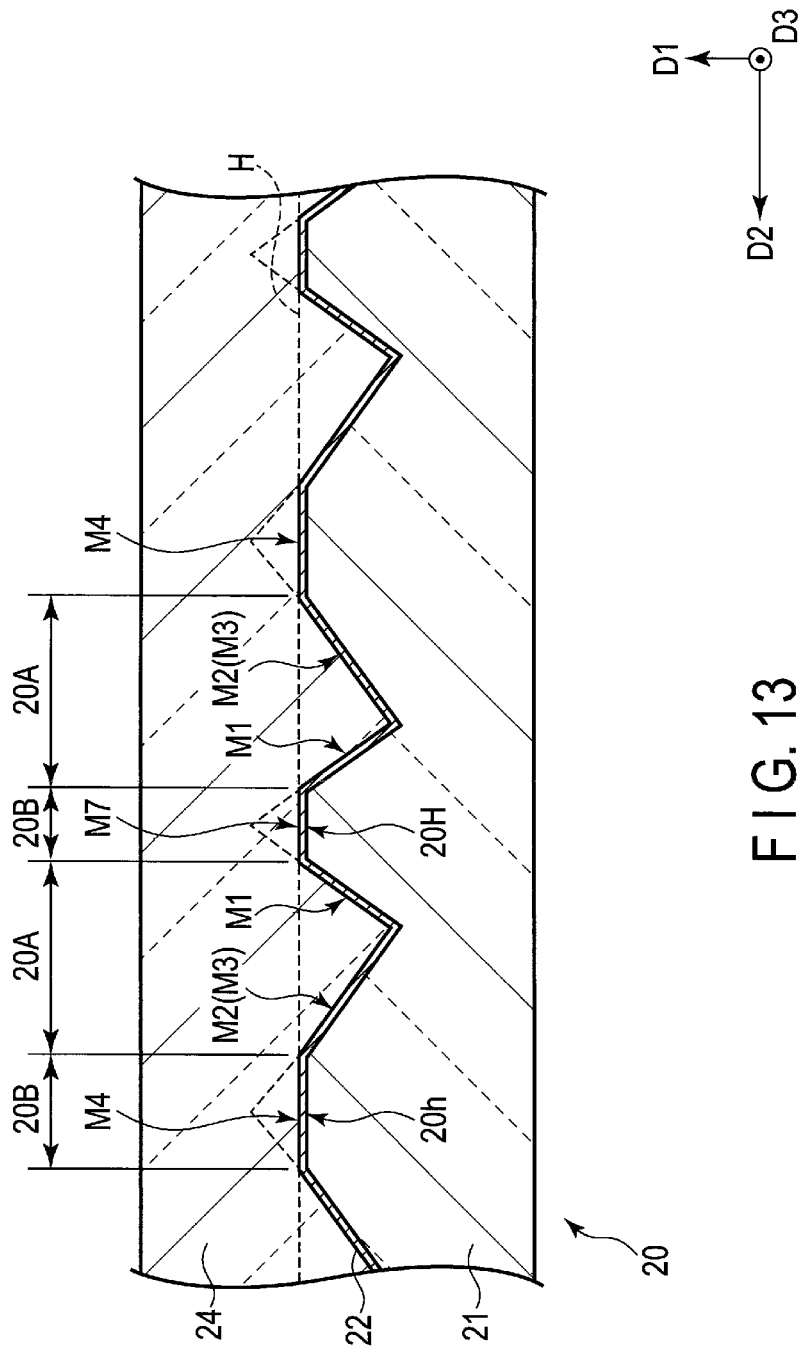
F I G. 13

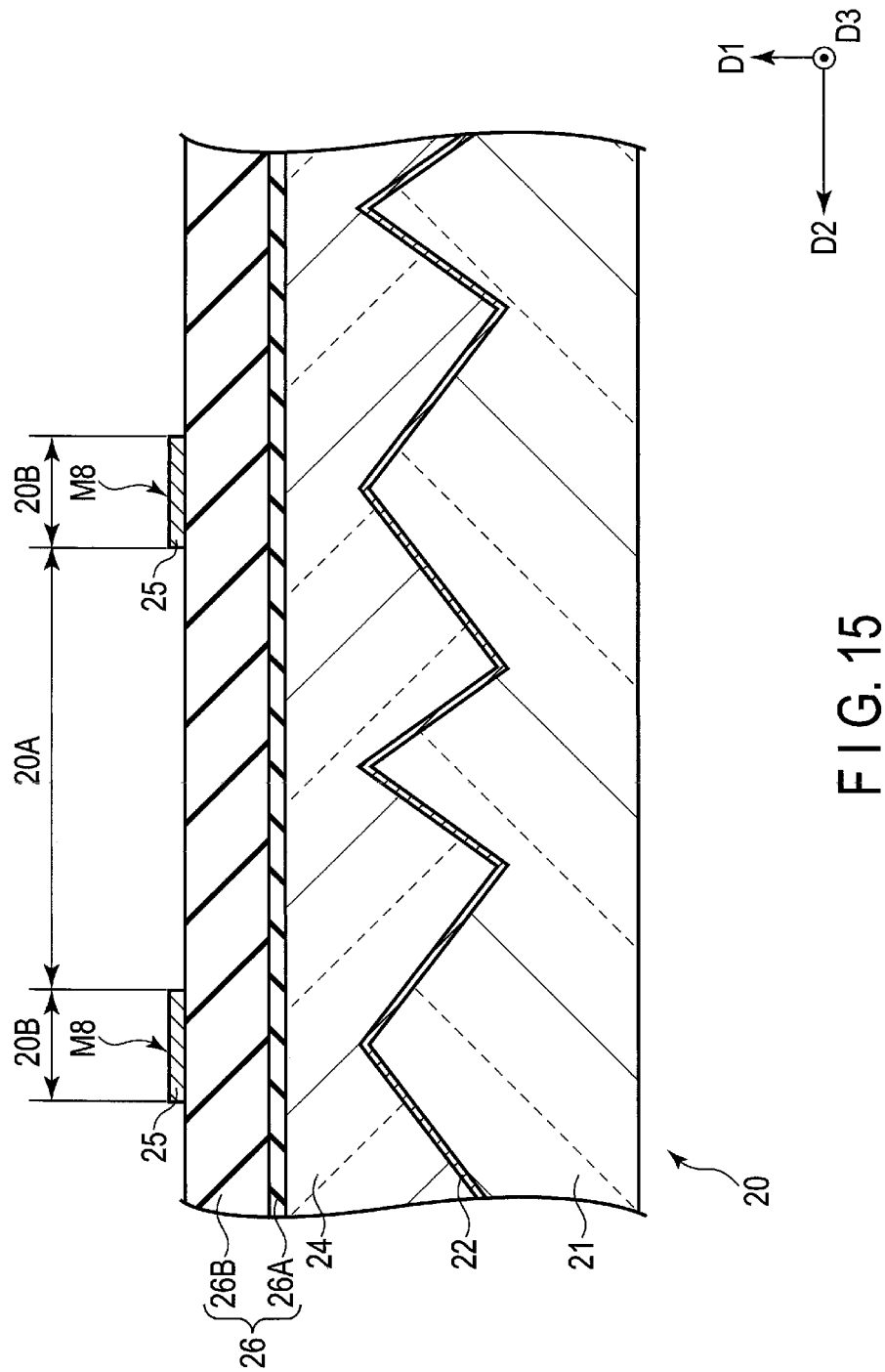
F I G. 15

DISPLAY DEVICE INCORPORATING REFLECTIVE AND RETROREFLECTIVE ELEMENTS

CROSS-REFERENCE TO RELATED APPLICATIONS

This application is based upon and claims the benefit of priority from Japanese Patent Application No. 2016-075789, filed Apr. 5, 2016, the entire contents of which are incorporated herein by reference.

FIELD

Embodiments described herein relate generally to a display device.

BACKGROUND

A display device forms an image in the air by combining an optical element which transmits or reflects incident light and a retroreflective element which retroreflects incident light. For example, an optical device which comprises a first retroreflective member and a second retroreflective member is known. The first retroreflective member reflects the light flux reflected on a reflective member (partial reflective member) having a transmittance of 70% and a reflectance of 30% to the partial reflective member. The second retroreflective member reflects the light flux having passed through the partial reflective member to the partial reflective member. When the reflective surface of the retroreflective element has a region which does not exhibit a retroreflective property, the light having entered the region does not contribute to formation of an image. As a result, the image in the air may be discontinuous.

BRIEF DESCRIPTION OF THE DRAWINGS

FIG. 5 is a cross-sectional view showing a structural example of the display panel PNL shown in FIG. 4.

FIG. 6 is a plan view showing a structural example of reflective portions 20A and 20B shown in FIG. 3.

FIG. 11 is a cross-sectional view showing a first modification example of reflective element 20 shown in FIG. 7.

FIG. 13 is a cross-sectional view showing a third modification example of reflective element 20 shown in FIG. 7.

FIG. 15 is a cross-sectional view showing a fifth modification example of reflective element 20 shown in FIG. 7.

DETAILED DESCRIPTION

Figure 1:
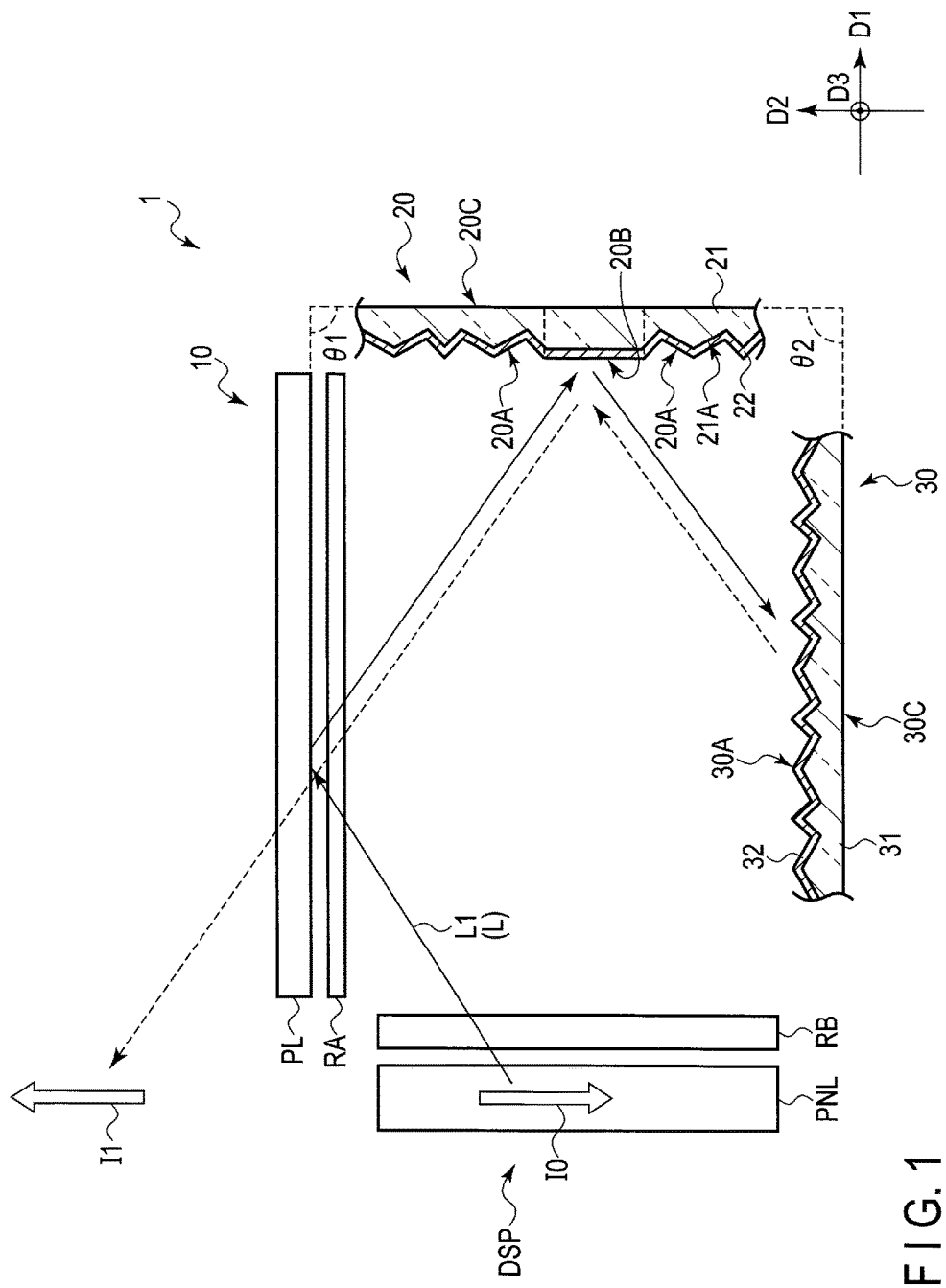
FIG. 1 shows a structural example of a display device 1 according to an embodiment, and the path of display light L1.

In general, according to one embodiment, a display device comprises an optical element which transmits or reflects incident light, and a first reflective element comprising a first reflective portion and a second reflective portion. The first reflective portion retroreflects reflective light reflected on the optical element. The second reflective portion has an area less than an area of the first reflective portion and specularly reflects (also known as "regular reflection") the reflective light.

An embodiment will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes, etc., of the respective parts are illustrated in the drawings schematically, rather than as an accurate representation of what is implemented. However, such schematic illustration is merely exemplary, and in no way restricts the interpretation of the invention. In addition, in the specification and drawings, structural elements which function in the same or a similar manner to those described in connection with preceding drawings are denoted by like reference numbers, detailed description thereof being omitted unless necessary.

FIG. 1 shows a structural example of a display device 1 according to an embodiment, and the path of display light L1.

The display device 1 comprises a display portion DSP, an optical element 10, reflective elements 20 and 30, etc. The display portion DSP faces reflective element 20 in a first direction D1. The optical element 10 faces reflective element 30 in a second direction D2. The second direction D2 and the first direction D1 intersect each other. In the example shown in FIG. 1, the second direction D2 is perpendicular to the first direction D1. However, the first direction D1 and the second direction D2 may intersect at an angle other than a right angle. A third direction D3 intersects with the first and second directions D1 and D2. In the example shown in FIG. 1, the third direction D3 is perpendicular to the first and second directions D1 and D2. However, the third direction D3 may intersect with the first and second directions D1 and D2 at an angle other than a right angle. In the example shown in FIG. 1, the display portion DSP and reflective element 20 are parallel to plane D2-D3 defined by the second and third directions D2 and D3. However, the layout is not limited to this example. In the example shown in FIG. 1, the optical element 10 and reflective element 30 are parallel to plane D3-D1 defined by the third and first directions D3 and D1. However, the layout is not limited to this example. The display portion DSP may be inclined from the normal direction of the optical element 10. For example, the display portion DSP may be provided so as to make an acute angle with the optical element 10.

The structure of the display portion DSP is not particularly limited as long as it emits display light L. In the example shown in FIG. 1, the display portion DSP comprises a display panel PNL and a retardation film RB. For example, the display panel PNL is a liquid crystal display panel retaining a liquid crystal layer between a pair of substrates. The display panel PNL may be a self-luminous display panel comprising an organic electroluminescence (OEL) element, an electronic-paper display panel comprising an electrophoretic element, a display panel to which microelectromechanical systems (MEMS) is applied, a display panel to which electrochromism is applied, etc.

The liquid crystal display panel may be of a transmissive type which displays an image by selectively transmitting light emitted from a light source, a reflective type which displays an image by selectively reflecting outside light or light emitted from a light source, or a transflective type which has both a transmissive display function and a reflective display function.

The display portion DSP is not limited to the structure comprising the display panel. The display portion DSP may comprise a screen on which light emitted from a projector is projected, or a display medium illuminated by an illumination device, such as a poster.

The display panel PNL emits display light L1 showing display image I0. Display light L1 is, for example, linearly polarized light immediately after the emission from the display panel PNL. Retardation film RB faces the display panel PNL so as to be substantially parallel to the display panel PNL. Retardation film RB may be attached to the emission surface of the display panel PNL. Retardation film RB is, for example, a quarter-wave plate which applies a retardation of approximately $\lambda/4$ to transmitted light, where A is the wavelength of transmitted light (display light L1). Briefly speaking, retardation film RB is provided such that its slow axis and the polarization plane of linearly polarized display light L1 intersect at an angle of 45°. In the display portion DSP, linearly polarized display light L1 emitted from the display panel PNL is converted into circularly polarized light by traveling through retardation film RB. Subsequently, display light L1 is emitted from the display portion DSP. In the present embodiment, circularly polarized light includes elliptically polarized light. When the light emitted from the display panel PNL is circularly polarized light, retardation film RB is omitted in the display portion DSP.

The structure of the optical element 10 is not particularly limited as long as it transmits or reflects incident light. In the example of FIG. 1, the optical element 10 comprises a polarization element PL and a retardation film RA. The polarization element PL is a reflective polarizer which comprises a transmission axis for transmitting first linearly polarized light and reflects second linearly polarized light perpendicular to the transmission axis. For example, the first linearly polarized light is a P-wave parallel to the incident surface. The second linearly polarized light is an S-wave perpendicular to the incident surface. The polarization element PL comprises, for example, a wire grid polarization filter, a reflective polarization film to which a brightness enhancement film is applied, or a multilayer structure of the reflective polarization film and an absorptive polarizer. The absorptive polarizer is a polarizer which transmits linearly polarized light parallel to the transmission axis and absorbs linearly polarized light perpendicular to the transmission axis. For example, the degree of polarization of the absorptive polarizer is greater than that of the reflective polarizer. When the polarization element PL has the above multilayer structure, the absorptive polarizer is provided on the reflective polarization film (in other words, on a side opposite to the side facing retardation film RA), and comprises a transmission axis parallel to the transmission axis of the reflective polarization film.

Retardation film RA faces the polarization element PL so as to be substantially parallel to the polarization element PL. Retardation film RA may be attached to the polarization element PL on the side facing the display portion DSP and the reflective element 20. Retardation film RA is, for example, a quarter-wave plate which applies a retardation of approximately $\lambda/4$ to transmitted light, where A is the wavelength of transmitted light. Each of retardation films RA and RB may have a multilayer structure of a plurality of retardation films having different retardations and wavelength dispersibilities. For example, to relax the wavelength dependence, each of retardation films RA and RB may be structured by combining a half-wave plate and a quarter-wave plate. Briefly speaking, retardation film RA is provided such that its slow axis and the polarization plane of linearly polarized light intersect at an angle of 45°.

Reflective element 20 comprises reflective portions 20A and 20B on the side facing retardation film RA and the display portion DSP. Reflective portion 20A comprises an uneven surface and retroreflects incident light. Reflective portion 20B comprises, for example, a flat surface, and specularly reflects incident light. In reflective element 20, a flat surface refers to a surface parallel to plane D2-D3, and an uneven surface refers to a surface comprising concave and convex portions relative to plane D2-D3. In the example of FIG. 1, reflective portion 20B is located between reflective portions 20A.

Reflective element 20 comprises a base member 21 and a thin metal film 22. Base member 21 is formed of, for example, a resinous material. In the example shown in FIG. 1, base member 21 comprises a top surface 21A such that top surface 21A is uneven in a region corresponding to reflective portion 20A and is flat in a region corresponding to reflective portion 20B. In the example of FIG. 1, reflective element 20 comprises a flat rear surface 20C (that is, the rear surface of base member 21 in the example). Thin metal film 22 is formed by, for example, deposition, and covers top surface 21A of base member 21. The thickness of thin metal film 22 is substantially uniform. Thin metal film 22 is formed of a light reflective material such as silver (Ag), aluminum (Al) or aluminum alloy.

Thin metal film 22 forms reflective portions 20A and 20B. In the example of FIG. 1, reflective element 20 comprises an uneven surface equivalent to reflective portion 20A and a flat surface equivalent to reflective portion 20B inside the display device 1 where various optical members such as retardation films RA and RB are provided. Outside the display device 1, reflective element 20 comprises a flat surface (rear surface 20C). A surface treatment may be applied to thin metal film 22 to prevent corrosion. Thin metal film 22 may be coated with an inorganic material such as silicon nitride (SiN). Thin metal film 22 may be covered by a resinous overcoat layer 24 as described later. In this case, reflective element 20 comprises a flat surface inside the display device 1 even in a region corresponding to reflective portion 20A. When base member 21 is formed of a light reflective material, top surface 21A of base member 21 may form reflective portions 20A and 20B. The transmittance of reflective portions 20A and 20B is substantially zero. The light having entered reflective portions 20A and 20B hardly reaches rear surface 20C of reflective element 20. Reflective element 20 may comprise base member 21 inside the display device 1 and may comprise thin metal film 22 outside the display device 1. In this case, reflective element 20 comprises a flat surface (rear surface 20C) inside the display device 1. Outside the display device 1, reflective element 20 comprises an uneven surface equivalent to reflective portion 20A and a flat surface equivalent to reflective portion 20B.

Reflective element 30 comprises a reflective portion 30A on the side facing the optical element 10 and reflective element 20. Reflective portion 30A comprises an uneven surface and retroreflects incident light. In the example of FIG. 1, reflective element 30 comprises a base member 31, and a thin metal film 32 provided on base member 31 on the side facing reflective element 20. Reflective portion 30A is formed by thin metal film 32 which covers the uneven surface of base member 31. In the example of FIG. 1, reflective element 30 comprises an uneven surface (reflective portion 30A) inside the display device 1. Outside the display device 1, reflective element 30 comprises a flat surface (rear surface 30C). Base member 31 and thin metal film 32 of reflective element 30 may have structures similar to those of base material 21 and thin metal film 22 of reflective element 20. In the present embodiment, reflective element 30 may be omitted.

Reflective element 20 is provided so as to make angle $\theta 1$ with the optical element 10. Angle $\theta 1$ is equivalent to, for example, the angle between rear surface 20C and the top surface of the polarization element PL. Reflective element 30 is provided so as to make angle $\theta 2$ with reflective element 20. For example, angle $\theta 2$ is the angle between rear surface 30C and rear surface 20C. Angle $\theta 1$ is not particularly limited as long as the display light reflected on the optical element 10 enters reflective portion 20A or 20B at angle $\theta 1$. Angle $\theta 2$ is not particularly limited as long as the display light reflected on reflective portion 20B enters reflective portion 30A at angle $\theta 2$. For example, both angle $\theta 1$ and angle $\theta 2$ are approximately 90°. In terms of retroreflective efficiency on reflective portion 20A, angle $\theta 1$ is preferably greater than or equal to 45° and less than or equal to 135°. In terms of retroreflective efficiency on reflective portion 30A, angle $\theta 2$ is preferably greater than or equal to 45° and less than or equal to 135°.

The path of display light L1 is explained as an example of the behavior of display light L emitted from the display portion DSP. Display image I1 corresponds to the real image of display image I0. Display image I1 is formed at a position such that display image I1 and display image I0 are symmetrical with respect to the optical element 10. First, display light L1 displaying display image I0 is emitted from the display portion DSP and enters the optical element 10. Display light L1 is reflected on the optical element 10. Subsequently, display light L1 is reflected on reflective portion 20B and enters reflective portion 30A. Subsequently, display light L1 is retroreflected on reflective portion 30A and reflected on reflective portion 20B again. Subsequently, display light L1 passes through the optical element 10 and forms display image I1.

Reflective elements 20 and 30 may be formed as a single member comprising a continuous reflective surface. An example of this structure is shown in FIG. 23.

Figure 23:
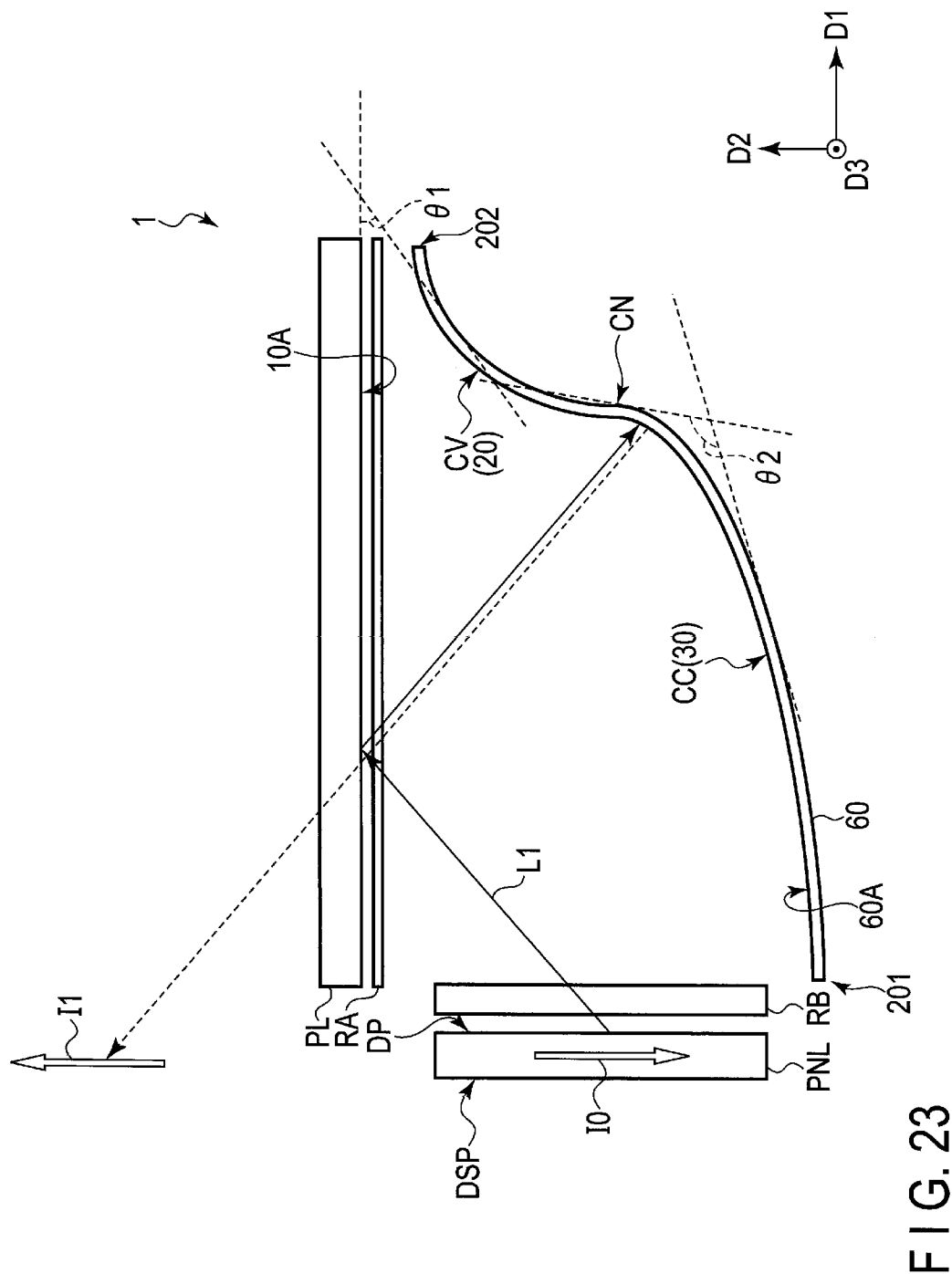
FIG. 23 is a structural example of the display device 1 when it comprises a reflective element 60.

FIG. 23 is a structural example of the display device 1 when it comprises a reflective element 60. Reflective element 60 faces the display portion DSP and retardation film RA. Reflective element 60 comprises a curved reflective surface 60A on the side facing the display portion DSP and retardation film RA. Reflective element 60 comprises a first portion CC and a second portion CV in the first direction D1. The first portion CC is located between an end portion 201 of reflective element 60 on the side close to the display portion DSP and a connective portion CN connecting the first and second portions CC and CV. The second portion CV is located between an end portion 202 of reflective element 60 on the side opposite to end portion 201 and the connective portion CN. The first portion CC is concave, and the second portion CV is convex. In this structure, a concave shape indicates that reflective surface 60A is recessed so as to be away from the display portion DSP and the optical element 10. The first portion CC is provided such that the part located between end portion 201 and the connective portion CN is more distant from the display portion DSP and the optical element 10 than end portion 201 and the connective portion CN. A convex shape indicates that reflective surface 60A projects to the display portion DSP and the optical element 10. The second portion CV is provided such that the part located between end portion 202 and the connective portion CN is closer to the display portion DSP and the optical element 10 than end portion 202 and the connective portion CN.

The first portion CC is equivalent to reflective element 30, and the second portion CV is equivalent to reflective element 20. Thus, although not shown in the figure, reflective portions 20A and 20B are provided in the second portion CV. Reflective portions 30A and 30B are provided in the first portion CC. The first portion CC (reflective element 30) and the second portion CV (reflective element 20) are continuously formed. Reflective element 60 is formed by, for example, a single sheet-like member which is curved along reflective surface 60A. Note that reflective element 60 may be manufactured by forming the first portion CC and the second portion CV as separate members and connecting them.

With regard to the positional relationship of reflective element 60 in the first direction D1, the first portion CC is closer to the display portion DSP than the second portion CV. With regard to the positional relationship of reflective element 60 in the second direction D2, the first portion CC is more distant from the polarization element PL and retardation film RA than the second portion CV. As shown in FIG. 23, reflective element 60 has substantially an S-shape on the cross-sectional surface defined by the first and second directions D1 and D2.

In this structure, angle $\theta 1$ is equivalent to the angle between the second portion CV and the optical element 10. Angle $\theta 2$ is equivalent to the angle between the first portion CC and the second portion CV. Since each of the first portion CC and the second portion CV is curved, angles $\theta 1$ and $\theta 2$ change based on the positions in the first portion CC and the second portion CV, respectively. Angle $\theta 1$ is at a minimum in end portion 202 away from the first member CC of reflective element 60, and is at a maximum in the connective portion CN connecting the first and second members CC and CV. In this case, in terms of retroreflective efficiency, angle θ1 is preferably greater than 0° and less than 90°. Similarly, in terms of retroreflective efficiency, angle θ2 is preferably greater than 0° and less than 180°.

Figure 2:
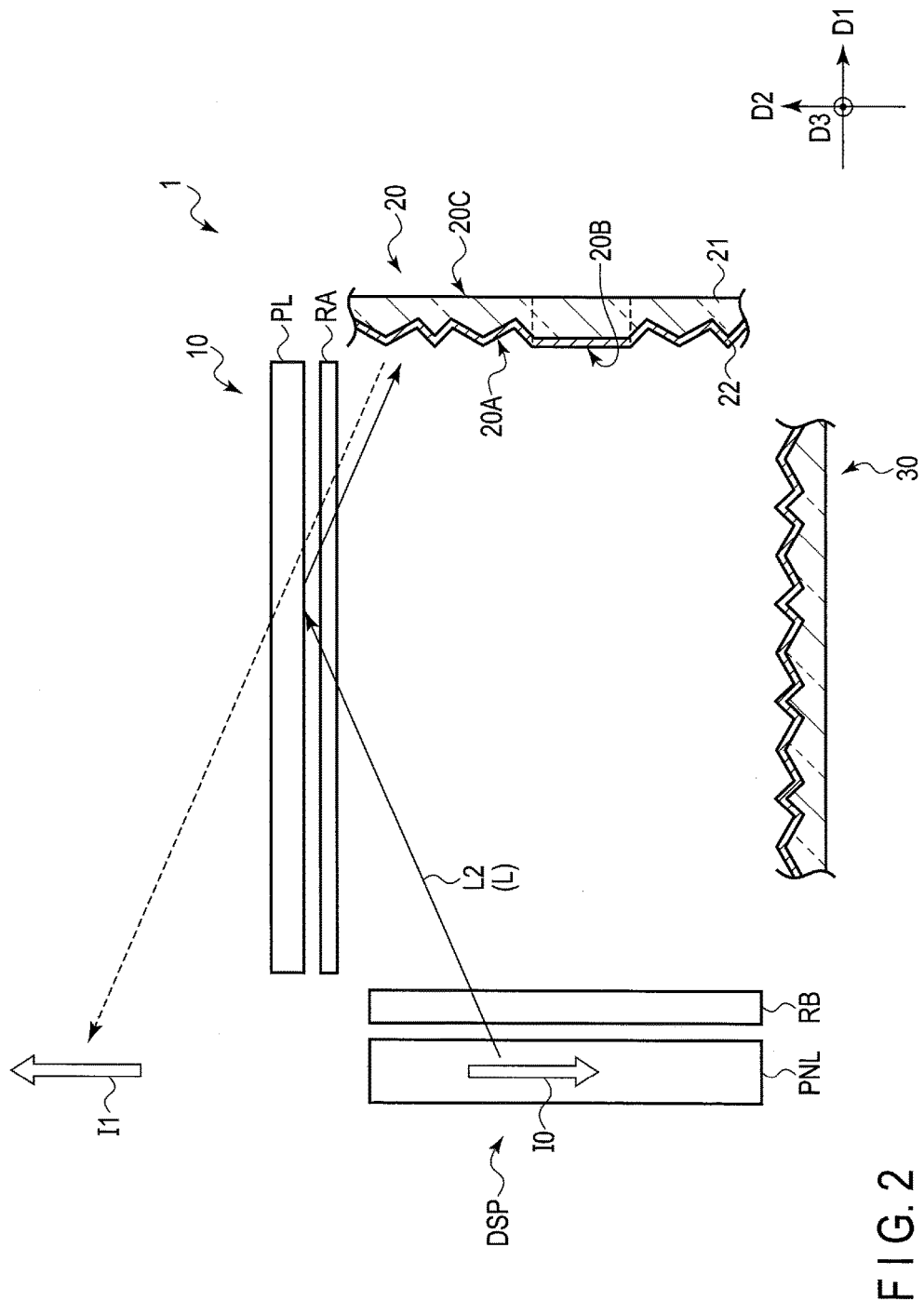
FIG. 2 shows the path of display light L2 in the display device 1 shown in FIG. 1.

FIG. 2 shows the path of display light L2 in the display device 1 shown in FIG. 1.

Here, this specification explains the behavior of display light L emitted from the display portion DSP, looking at display light L2 following a path different from that of display light L1 as an example of display light L forming display image I1.

The display panel PNL emits display light L2 displaying display image I0. For example, display light L2 is display light L emitted from the same position as display light L1 in a different direction. As is the case with display light L1, display light L2 is linearly polarized light immediately after the emission from the display panel PNL. Display light L2 is converted into circularly polarized light by traveling through retardation film RB. After the emission from the display portion DSP, display light L2 is reflected on the optical element 10 and enters reflective portion 20A. Display light L2 is retroreflected on reflective portion 20A. Subsequently, display light L2 passes through the optical element 10 and forms display image I1.

Figure 3:
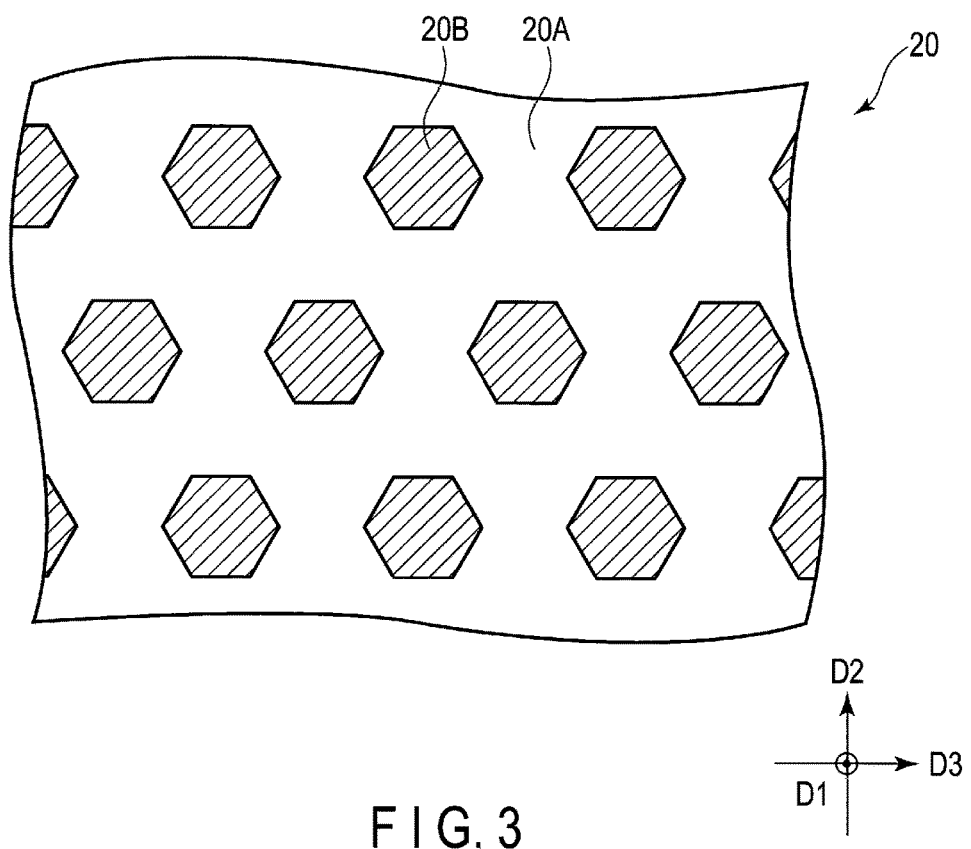
FIG. 3 shows a structural example of a reflective element 20 shown in FIG. 1.

FIG. 3 shows a structural example of reflective element 20 shown in FIG. 1.

FIG. 3 is a plan view on plane D2-D3 defined by the second and third directions D2 and D3 perpendicular to each other. When reflective element 20 is seen in plan view, plane D2-D3 of reflective element 20 is observed in the first direction D1. In plan view, the area of a region is equivalent to the area of a region projected on plane D2-D3.

Reflective element 20 is parallel to plane D2-D3 defined by the second and third directions D2 and D3. In the example of FIG. 3, reflective element 20 comprises retroreflective portion 20A and a plurality of specular-reflective portions 20B provided in a dispersed manner. Reflective portion 20A has a net-shape on plane D2-D3. Each reflective portion 20B is surrounded by reflective portion 20A. Reflective portions 20B are isolated from each other and arranged in a zigzag form. When reflective element 20 is seen in plan view, the total area of retroreflective portions 20B is less than that of specular-reflective portion 20A.

When reflective element 20 is seen in plan view, each reflective portion 20B is, for example, hexagonal. However, the shape or layout of reflective portions 20B is not particularly limited. For example, reflective portions 20B may not be isolated from each other, and may be continuously provided. Each reflective portion 20B may be formed so as to have a curved portion as seen as a circle. Each reflective portion 20B may not be hexagonal, and may be polygonal. For example, each reflective portion 20B may be triangular. Alternatively, each reflective portion 20B may be formed by combining the above shapes.

Figure 4:
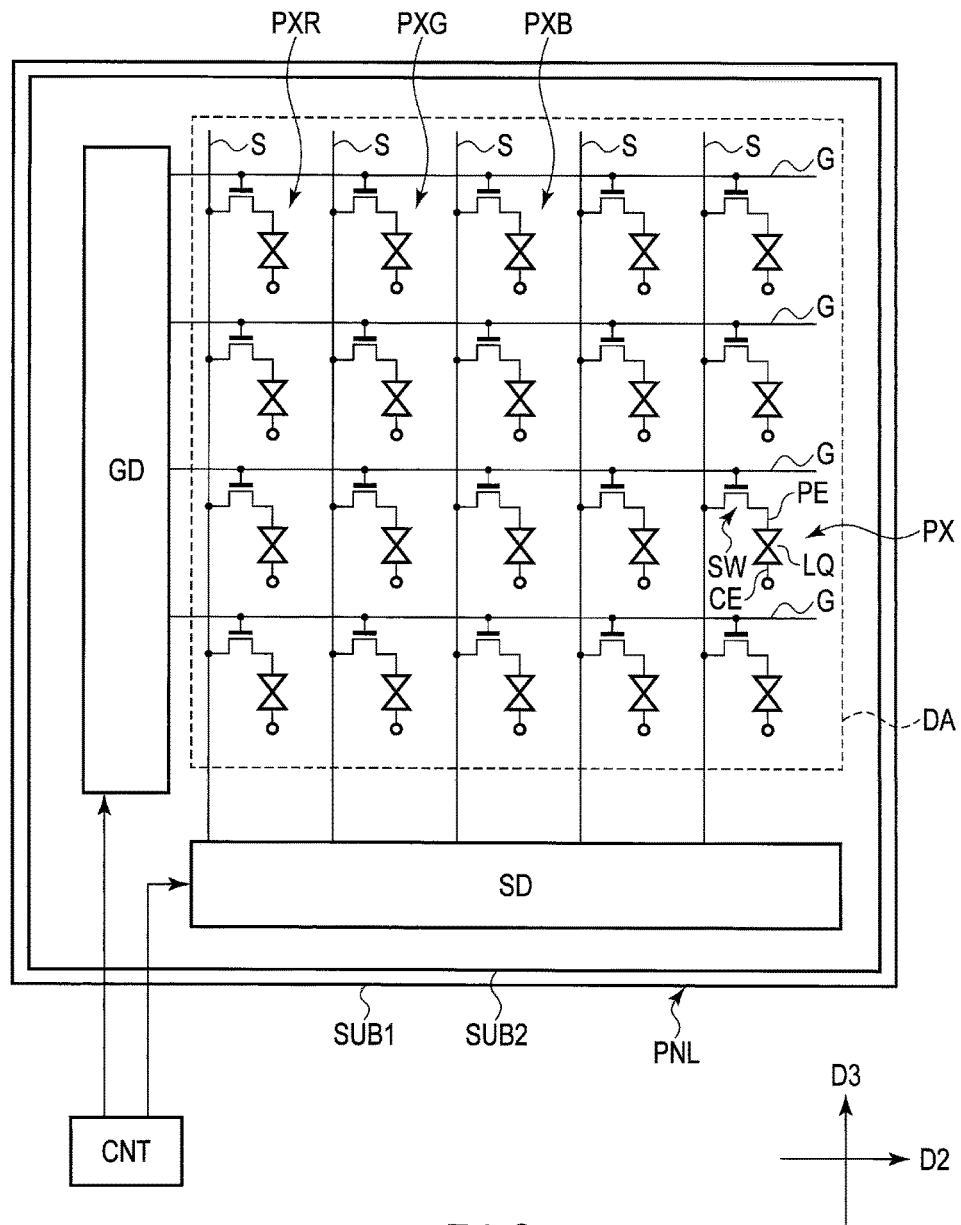
FIG. 4 shows a structural example of a display panel PNL shown in FIG. 1.

FIG. 4 shows a structural example of the display panel PNL shown in FIG. 1. In the example of FIG. 4, the display panel PNL comprises end portions extending in the second direction D2 and the third direction D3.

As an example of the display panel PNL, this specification explains a transmissive type liquid crystal display panel using an active matrix driving method. The display panel PNL comprises a first substrate SUB1, a second substrate SUB2 facing the first substrate SUB1, and a liquid crystal layer LQ provided between the first substrate SUB1 and the second substrate SUB2. The first substrate SUB1 is attached to the second substrate SUB2 such that a predetermined cell gap is defined between the substrates. The display panel PNL comprises a display area DA displaying an image. The display area DA comprises a plurality of subpixels PX arranged in matrix.

As the subpixels PX, the display area DA comprises, for example, red pixels PXR displaying red, green pixels PXG displaying green, and blue pixels PXB displaying blue. The display area DA may further comprise subpixels corresponding to a color different from red, green and blue (for example, white pixels displaying white). Each pixel for realizing color display comprises these subpixels PX corresponding to different colors. Here, each pixel is the minimum unit of a color image. In the example of FIG. 4, each pixel comprises a red pixel PXR, a green pixel PXG and a blue pixel PXB.

Each red pixel PXR comprises a red color filter, and is configured to mainly transmit red light from white light emitted from a light source device. Each green pixel PXG comprises a green color filter, and is configured to mainly transmit green light from white light emitted from a light source device. Each blue pixel PXB comprises a blue color filter, and is configured to mainly transmit blue light from white light emitted from a light source device. Each color filter may be formed on either the first substrate SUB1 or the second substrate SUB2 although the detailed structure is not explained here.

The first substrate SUB1 comprises a plurality of gate lines G extending in the second direction D2, and a plurality of source lines S extending in the third direction D3 and intersecting with the gate lines G. The gate lines G extend to the outside of the display area DA, and are connected to a gate driver GD. The source lines S extend to the outside of the display area DA, and are connected to a source driver SD. The gate driver GD and the source driver SD are connected to a controller CNT. The controller CNT generates a control signal based on a video signal, and controls the gate driver GD and the source driver SD.

Each subpixel PX comprises a switching element SW, a pixel electrode PE, a common electrode CE, etc. The switching element SW is electrically connected to the gate line G and the source line S. The switching element SW is structured by, for example, a thin-film transistor. The pixel electrode PE is electrically connected to the switching element SW. The common electrode CE faces a plurality of pixel electrodes PE.

The detailed structure of the display panel PNL is not explained here. Briefly speaking, the pixel electrode PE and the common electrode CE are provided on the first substrate SUB1 and the second substrate SUB2, respectively, in a display mode using a vertical electric field along the normal of the main side of each substrate or a display mode using an electric field inclined with respect to the normal line of the main side of each substrate. In a display mode using a lateral electric field along the main side of each substrate, both the pixel electrode PE and the common electrode CE are provided on the first substrate SUB1. The display panel PNL may have a structure corresponding to a display mode appropriately using a combination of the vertical electric field, the lateral electric field and the inclined electric field as necessary. In the example of FIG. 4, the main side of each substrate is equivalent to the plane defined by the second direction D2 and the third direction D3. The normal direction of the main side of each substrate is equivalent to a direction parallel to the first direction D1.

FIG. 5 is a cross-sectional view showing a structural example of the display panel shown in FIG. 4.

Here, this specification briefly explains the cross-sectional structure of the display panel PNL to which a fringe field switching (FFS) mode, which is one of display modes using the lateral electric field, is applied.

The first substrate SUB1 comprises a first insulating substrate 100, a first insulating film 110, a common electrode CE, a second insulating film 120, pixel electrodes PE1 to PE3, a first alignment film AL1, etc. The common electrode CE extends over a red pixel PXR, a green pixel PXG and a blue pixel PXB. Each of pixel electrode PE1 of the red pixel PXR, pixel electrode PE2 of the green pixel PXG and pixel electrode PE3 of the blue pixel PXB faces the common electrode CE, and comprises a slit SLA. In the example of FIG. 5, the common electrode CE is located between the first insulating film 110 and the second insulating film 120. Pixel electrodes PE1 to PE3 are located between the second insulating film 120 and the first alignment film AL1. Pixel electrodes PE1 to PE3 may be located between the first insulating film 110 and the second insulating film 120. The common electrode CE may be located between the second insulating film 120 and the first alignment film AL1. In this case, each slit SLA is formed in the common electrode CE.

The second substrate SUB2 comprises a second insulating substrate 200, a light-shielding layer BM, color filters CFR, CFG and CFB, an overcoat layer OC, a second alignment film AL2, etc. Color filters CFR, CFG and CFB face pixel electrodes PE1, PE2 and PE3, respectively, across the intervening liquid crystal layer LQ. Color filter CFR is a red color filter. Color filter CFG is a green color filter. Color filter CFB is a blue color filter. In the example of FIG. 5, color filters CFR, CFG and CFB are formed in the second substrate SUB2; however, they may be formed in the first substrate SUB1.

The liquid crystal layer LQ is interposed between the first alignment film AL1 and the second alignment film AL2. A light source device LS faces the first substrate SUB1. Various forms may be applied to the light source device LS. The detailed structure of the light source device LS is not explained here.

A first optical element OD1 including a first polarizer PL1 is provided on the external side of the first insulating substrate 100. A second optical element OD2 including a second polarizer PL2 is provided on the external side of the second insulating substrate 200. The first polarizer PL1 comprises a first absorption axis. The second polarizer PL2 comprises a second absorption axis. For example, the first absorption axis of the first polarizer PL1 is perpendicular to the second absorption axis of the second polarizer PL2.

Pixels each comprising a red pixel PXR, a green pixel PXG and a blue pixel PXB are arranged with pitch P1.

FIG. 6 is a plan view showing a structural example of reflective portions 20A and 20B shown in FIG. 3.

Reflective element 20 comprises a plurality of reflectors 23. In the plan view of FIG. 6, the shape of each reflector 23 is an equilateral triangle. The center O of each reflector 23 is depressed toward the deep side of the paper surface. Each reflector 23 comprises three reflective surfaces M1 to M3 radially extending from the center O. Regions R1 to R3 are provided at positions corresponding to the apexes of each triangular reflector 23. Reflective portion 20A comprises reflective surfaces M1 to M3. Reflective portions 20B are provided in regions corresponding to regions R1 to R3.

Reflective surfaces M1 to M3 intersect each other and are adjacent to each other. Reflective surfaces M1 to M3 have the same shape. For example, the shape of each of reflective surfaces M1 to M3 is a pentagon sharing the center O with the others. Reflective surfaces M1 to M3 comprise a corner portion having a right angle in the center O. Reflective surfaces M1 to M3 are perpendicular to each other. Reflective portion 20A comprising reflective surfaces M1 to M3 having the above shape is called a corner cube or corner reflector. An air layer or a protective member which protects reflective surfaces M1 to M3 is provided inside the area surrounded by the three reflective surfaces M1 to M3. Each reflector 23 realizes retroreflection in which incident light is reflected on the three reflective surfaces M1 to M3 such that the reflected light follows substantially the same path as the incident light.

Regions R1 to R3 of the reflectors 23 are low-retroreflective portions in which the retroreflective efficiency is low. Even if reflective surfaces M1 to M3 extend in regions R1 to R3, the light having entered regions corresponding to regions R1 to R3 is reflected only once or twice and is not retroreflected depending on the angle with respect to the reflective surface of the incident light. For example, reflective portions 20B provided in regions corresponding to regions R1 to R3 may be formed by cutting the low-retroreflective portions, or may be formed so as to cover the low-retroreflective portions. As seen in plan view, region R1 is adjacent to reflective surfaces M1 and M2, and is isolated from the center O. Region R2 is adjacent to reflective surfaces M2 and M3, and is isolated from the center O. Region R3 is adjacent to reflective surfaces M3 and M1, and is isolated from the center O. Each of regions R1 to R3 is formed so as to be triangular as seen in plan view. In the example of FIG. 6, regions R1 to R3 are isolated from each other, and have the same area. In plan view, the total area of reflective surfaces M1 to M3 is greater than that of regions R1 to R3. In plan view, the area of reflective portions 20B is less than that of reflective portion 20A in each reflector 23. Each reflective portion 20B is formed by six reflectors 23, and is formed in a hexagonal region formed by assembling two regions R1, two regions R2 and two regions R3.

The reflectors 23 are arranged in the third direction D3. The reflectors 23 are arranged with pitch P2 in the second direction D2. The reflectors 23 adjacent to each other in the third direction D3 and the second direction D2 have inverted shapes with respect to each other. Reflective surface M1 is adjacent to reflective surface M1 in the second direction. Reflective surface M2 is adjacent to reflective surface M2 in the third direction D3. Reflective surface M3 is adjacent to reflective surface M3 in the third direction D3.

The resolution of display image I1 depends on pitch P2 of each reflector 23. To prevent the reduction of the resolution, pitch P2 is preferably less than pitch P1 of each pixel on the display panel PNL shown in FIG. 5.

Figure 7:
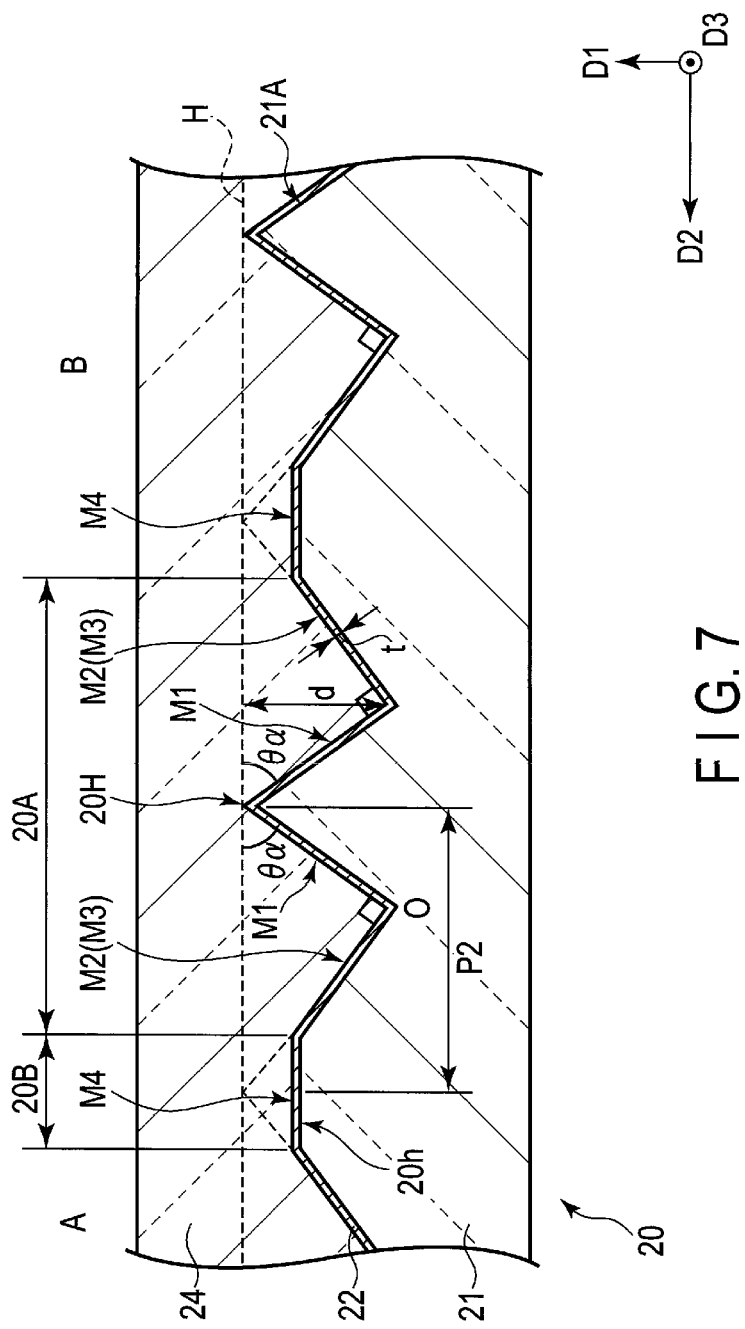
FIG. 7 is a cross-sectional view showing the structure of reflective element 20 cut along the line A-B shown in FIG. 6.

FIG. 7 is a cross-sectional view showing the structure of reflective element 20 cut along the line A-B shown in FIG. 6.

In the example of FIG. 7, reflective element 20 comprises the overcoat layer 24. In a region corresponding to reflective portion 20A, top surface 21A of base member 21 is uneven so as to comprise concave and convex portions relative to plane D2-D3. In a region corresponding to reflective portion 20B, top surface 21A of base member 21 is flat so as to be parallel to plane D2-D3. Top surface 21A over reflective portions 20A and 20B is shaped by, for example, metal molding.

Thin metal film 22 having thickness t is provided on top surface 21A. Thickness t of thin metal film 22 is uniform in reflective portions 20A and 20B. The overcoat layer 24 is provided on thin metal film 22, and covers, for example, thin metal film 22. It is possible to prevent the reduction of retroreflectance caused by damage or deformation of thin metal film 22. The overcoat layer 24 is formed of, for example, a transparent resinous material; however, the overcoat layer 24 may be formed of an inorganic material. Reflective element 20 may not comprise the overcoat layer 24. Thin metal film 22 may be exposed.

As shown in FIG. 7, each corner reflector formed by reflective surfaces M1 to M3 of reflective portion 20A is depressed with respect to the horizontal surface H (parallel to plane D2-D3) indicated by the dashed line. When base member 21 is located inside the display device 1, each corner reflector may be regarded as a structure projecting relative to the horizontal surface H. The horizontal surface H is a surface including an apex portion 20H located in an end portion of reflective surface M1 on a side opposite to the center O. An apex portion 20h located in end portions of reflective surfaces M2 and M3 on a side opposite to the center O is flat so as to be parallel to the horizontal surface H, and is isolated from the horizontal surface H. A reflective surface M4 is formed in apex potion 20h, and is a flat surface intersecting with reflective surfaces M1 to M3. A plurality of reflective surfaces M4 are located on the same plane. In the center O, the angle between reflective surface M1 and reflective surface M2 (or reflective surface M3) is 90°. In apex portion 20H, angle θα between reflective surface M1 and the horizontal surface is approximately 54.7°.

When pitch P1 of each pixel on the display panel PNL is 200 μm, pitch P2 of each reflector in reflective element 20 is 180 μm. Thus, pitch P2 is less than pitch P1. Reflective portion 20A has depth d in the first direction D1 equivalent to the normal direction of the horizontal surface H. For example, depth d is 73.5 μm. Thickness t of thin metal film 22 is 150 nm, and is sufficiently less than depth d. Thus, when thin metal film 22 is formed, the surface of base member 21 shaping reflective portion 20A is not buried by thin metal film 22, or reflective portion 20A is not destroyed.

Figure 8:
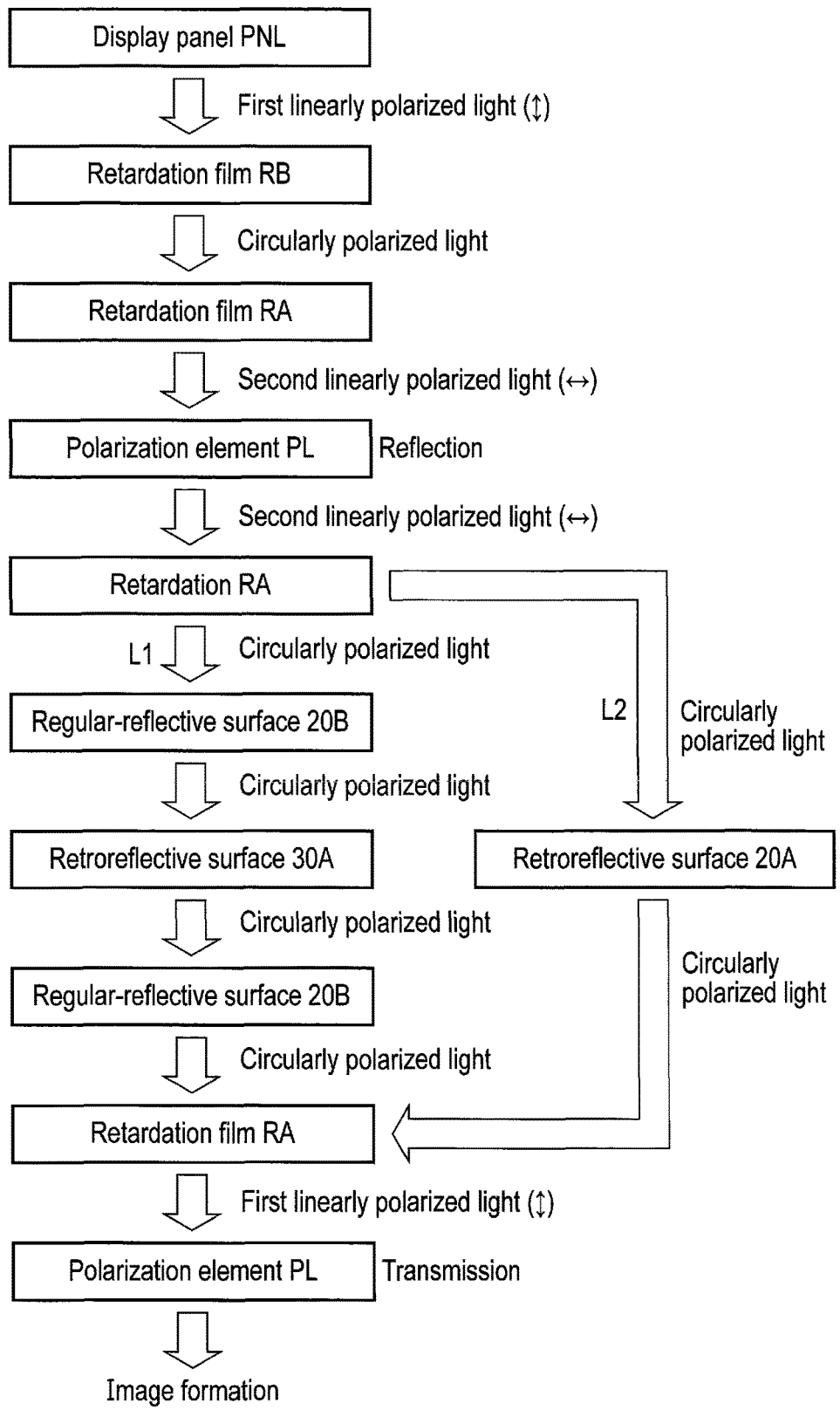
FIG. 8 is shown for explaining the function of each structure of the display device 1.

FIG. 8 is shown for explaining the function of each structure of the display device 1.

In the display portion DSP, the display panel PNL emits the first linearly polarized light equivalent to display light L1 and L2 of display image I0. The first linearly polarized light has a polarization plane parallel to the transmission axis of the polarization element PL, and is equivalent to linearly polarized light which passes through the polarization element PL. The first linearly polarized light passes through retardation film RB, and is converted into circularly polarized light. In this way, the display portion DSP emits circularly polarized display light.

Subsequently, retardation film RA transmits circularly polarized display light L1 and L2 so as to convert the light to the second linearly polarized light. The second linearly polarized light has a polarization plane perpendicular to the transmission axis of the polarization element PL. The second linearly polarized light is reflected on the polarization element PL. Subsequently, the second linearly polarized light passes through retardation film RA again and is converted into circularly polarized light.

Subsequently, circularly polarized display light L1 is specularly reflected on reflective portion 20B of reflective element 20. The circularly polarized light reflected on reflective portion 20B is retroreflected on reflective portion 30A of reflective element 30. Subsequently, the circularly polarized light is reflected on reflective portion 20B again, and travels through retardation film RA. In this way, the circularly polarized light is converted into the first linearly polarized light. Subsequently, the first linearly polarized display light L1 travels through the polarization element PL, and is formed as display image I1.

Display light L2 emitted from the display portion DSP is reflected on the polarization element PL, and is converted into circularly polarized light in retardation film RA. Subsequently, the light is retroreflected on reflective portion 20A of reflective element 20, and travels through retardation film RA. In this way, the light is converted into the first linearly polarized light. Subsequently, the first linearly polarized display light L2 travels through the polarization element PL, and is formed as display image I1. The observer can observe display image I1 formed in the air by display light L1 and L2.

In the present embodiment, reflective element 20 comprises retroreflective portion 20A and specular-reflective portions 20B. In plan view, the area of reflective portions 20B is less than that of reflective portion 20A. Reflective element 30 comprises retroreflective portion 30A. Thus, even when display light L1 enters low-retroreflective regions R1 to R3 of reflective element 20, display light L1 is reflected on reflective portion 20B and retroreflected on reflective portion 30A. In this way, display light L1 can contribute to the formation of display image I1. Thus, the display device 1 can reduce the discontinuousness of display image I1 and prevent degradation of the display quality.

For example, the optical element 10 comprises the reflective polarization element PL and retardation film RA. Thus, the display device 1 can effectively reflect the light emitted from the display portion DSP such that the light goes to reflective element 20 in comparison with when the optical element 10 is a half mirror. Thus, the display device 1 can improve the use efficiency of display light for forming display image I1. In this way, clear display image I1 can be formed. Moreover, the brightness of the display portion DSP can be controlled, thereby reducing the power consumption. The outside light which travels through the polarization element PL and goes to reflective elements 20 and 30 is converted into the first linearly polarized light. Subsequently, the light travels through retardation film RA, which is a quarter-wave plate, before or after reflection on reflective elements 20 and 30. Thus, the outside light which is reflected on reflective elements 20 and 30 and returns to the polarization element PL is the second linearly polarized light. This light cannot pass through the polarization element PL. It is possible to prevent a ghost generated by outside light.

When reflective surfaces M1 to M4 are formed of thin metal film 22, it is possible to prevent transmission of light in reflective portions 20A and 20B. In reflective element 20, reflection on rear surface 20C opposite to reflective surfaces M1 to M4 can be prevented. In this way, the display device 1 can prevent generation of a ghost.

Reflective element 30 may have the same structure as reflective element 20 explained above. This specification explains an example of the path of display light when reflective element 30 has the same structure as reflective element 20 with reference to FIG. 9 and FIG. 10. Display light L3 and L4 explained in FIG. 9 and FIG. 10 are different from display light L1 and L2 shown in FIG. 1 and FIG. 2 in respect that display light L3 and L4 go to reflective element 30 after reflection on the optical element 10.

Figure 9:
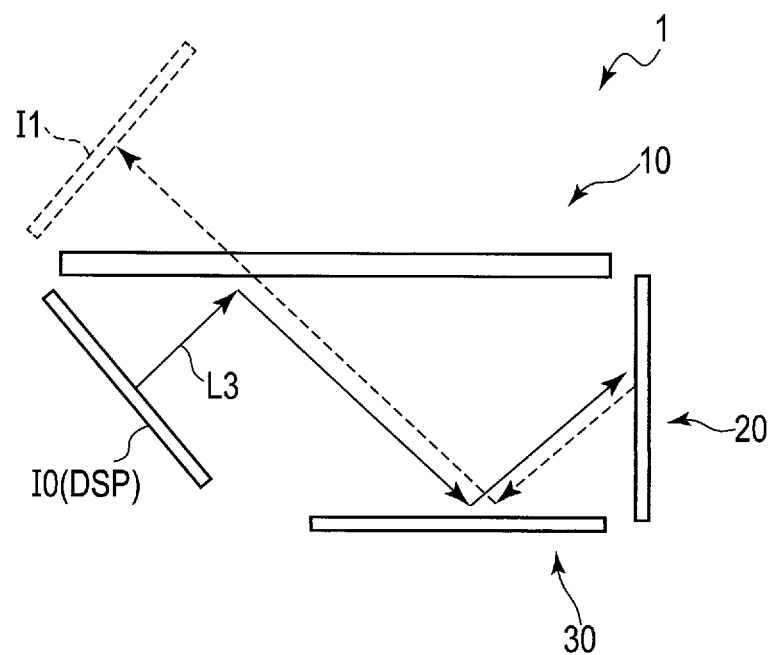
FIG. 9 shows the path of display light L3 in the display device 1.

FIG. 9 shows the path of display light L3 in the display device 1.

Display light L3 is reflected on the optical element 10, and is specularly reflected on reflective element 30. Subsequently, display light L3 is retroreflected on reflective element 20, and is specularly reflected on reflective element 30. Subsequently, display light L3 passes through the optical element 10 and forms display image I1.

Figure 10:
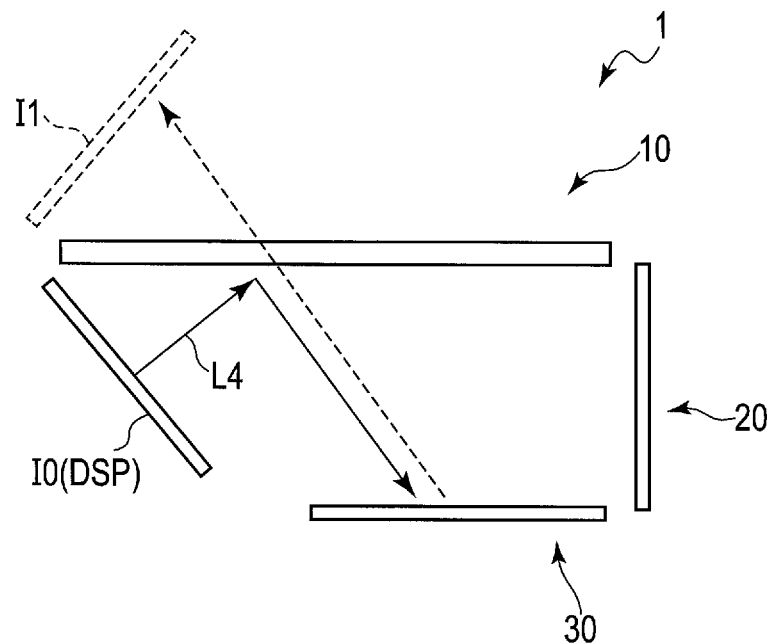
FIG. 10 shows the path of display light L4 in the display device 1.

FIG. 10 shows the path of display light L4 in the display device 1.

Display light L4 is reflected on the optical element 10, and is retroreflected on reflective element 30. Subsequently, display light L4 passes through the optical element 10 and forms display image I1.

As described above, since reflective element 30 is provided, display light L which is emitted from the display portion DSP and reflected on the optical element 10 even toward reflective element 30 can contribute to formation of display image I1. When reflective element 30 comprises a specular-reflective portion in a manner similar to that of reflective element 20, display light L3 which enters a low-retroreflective region of reflective element 30 can also contribute to formation of display image I1. Reflective element 20 and reflective element 30 may be continuously formed. For example, they may be formed by bending a single reflective element.

Now, this specification explains some modification examples of the present embodiment. The same structures as the above structural examples are denoted by the same reference numbers, detailed description thereof being omitted. Effects similar to those of the above embodiment can be obtained from the modification examples.

FIG. 11 is a cross-sectional view showing a first modification example of reflective element 20 shown in FIG. 7.

The first modification example is different from the structural example shown in FIG. 7 in respect that the first modification example comprises a projecting portion PJ in a region corresponding to reflective portion 20B.

The projecting portion PJ projects so as to be away from the center C in the first direction D1. In the example of FIG. 11, base member 21 is located outside the display device 1 in reflective element 20. Thus, the projecting portion PJ comprises base member 21 projecting so as to be away from the center O, and thin metal film 22 covering base member 21. When base member 21 is located inside the display device 1 in reflective element 20, the projecting portion PJ can be regarded as a structure in which an air layer or the overcoat layer 24 projects relative to base member 21. In this case, the projecting portion PJ comprises base member 21 depressed so as to be away from the center O, and thin metal film 22 covering base member 21. The projecting portion PJ may be covered by the overcoat layer 24, and the surface of reflective element 20 in a region corresponding to the projecting portion PJ may be flat.

In the example of FIG. 11, the projecting portion PJ projects from the horizontal surface H to a side opposite to the center O. The projecting portion PJ comprises reflective surfaces M5 and M6. The projecting portion PJ comprises an apex portion 20i. In the projecting portion PJ, apex portion 20i is the most distant from the center O in the first direction D1. In the example of FIG. 11, apex portion 20h located in an end portion of reflective surface M2 or M3 is located on a side closer to the center O than the horizontal surface H. Apex portion 20i is located on a side more distant from the center O than the horizontal surface H. Reflective surfaces M5 and M6 are formed between apex portions 20h and 20i. Apex portion 20h may be located on a side more distant from the center O than the horizontal surface H. Apex portion 20i may be located on a side closer to the center O than the horizontal surface H.

When rear surface 20C of reflective element 20 (in the example of FIG. 11, the rear surface of base material 21) is provided on the display portion DSP side, in other words, when rear surface 20C is provided so as to face the display portion DSP in FIG. 2, a transparent protective plate may be provided on the reflective portion 20A side, and a columnar spacer may be provided to support the gap between reflective portion 20A and the protective plate. Thus, an air layer may be formed. Since the retroreflection efficiency is low in the columnar spacer, the columnar spacer may be provided in a part of reflective portion 20B, and the columnar spacer may be covered by thin metal film 22 in a manner similar to that of the projecting portion PJ.

In this structure, display light L having entered reflective portion 20B can be reflected on reflective surfaces M5 and M6 toward reflective portion 20A. When display light L enters reflective surface M5 or M6, the path of display light L is as follows. Display light L emitted from the display portion DSP is reflected on the optical element 10. Subsequently, display light L is specularly reflected on reflective portion 20B, and is retroreflected on reflective portion 20A. Subsequently, display light L is specularly reflected on reflective portion 20B, and passes through the optical element 10. In this way, display light L forms display image I1. Thus, the display device 1 can prevent degradation of display quality even without comprising reflective element 30.

Figure 12:
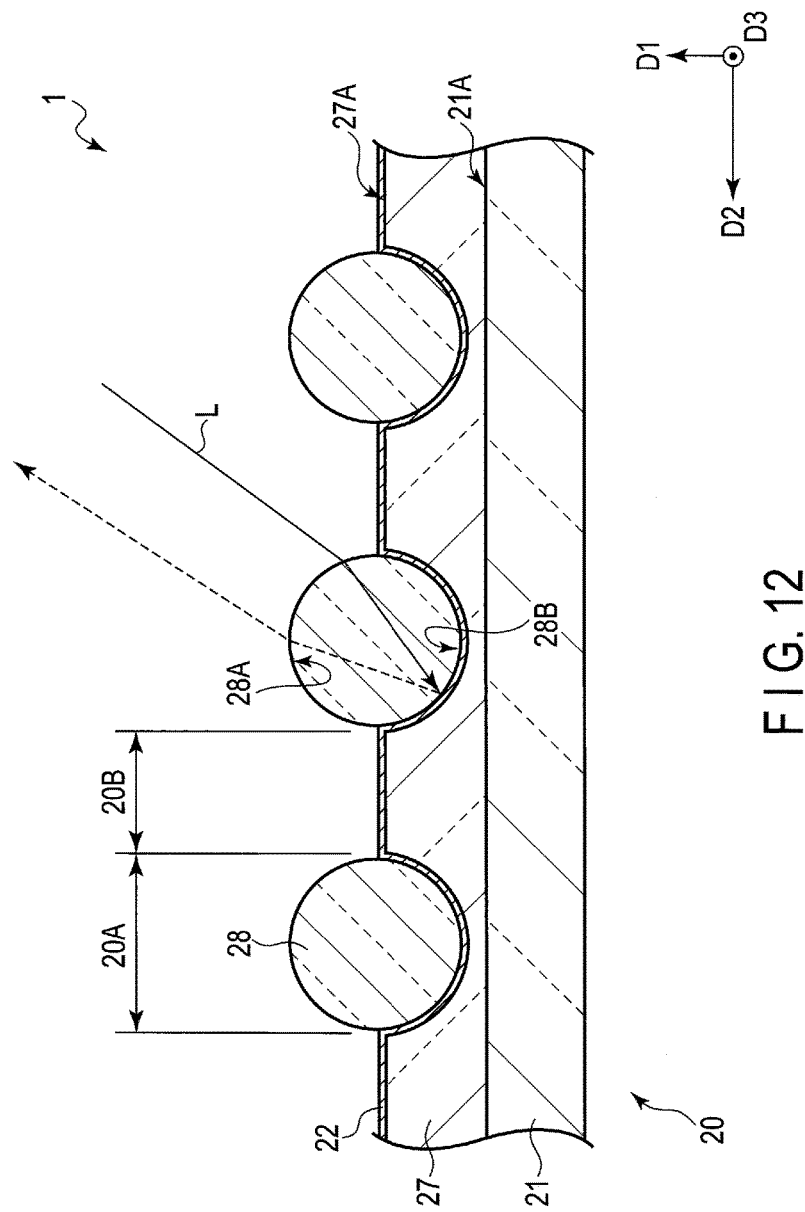
FIG. 12 is a cross-sectional view showing a second modification example of reflective element 20 shown in FIG. 7.

FIG. 12 is a cross-sectional view showing a second modification example of reflective element 20 shown in FIG. 7.

The second modification example is different from the structural example shown in FIG. 7 in respect that reflective portion 20A is structured by a spherical member 28 instead of the reflector 23.

Reflective element 20 comprises base member 21, a supporter layer 27, thin metal film 22 and the spherical members 28. Top surface 21A of base member 21 is flat. The supporter layer 27 is provided on top surface 21A. The supporter layer 27 comprises a top surface 27A on a side opposite to the side facing base member 21. Top surface 27A alternately comprises a flat portion and a concave portion. Thin metal film 22 is provided on top surface 27A. The spherical member 28 is provide in each concave portion of top surface 27A, and is partially embedded in the supporter layer 27. Thin metal film 22 is also provided between the spherical members 28 and the supporter layer 27. Each spherical member 28 comprises a curved surface 28A on the side close to the optical element 10. Curved surface 28A is located on the side away from base member 21, and is isolated from the supporter layer 27 and thin metal film 22. Each spherical member 28 comprises a curved surface 28B on the side away from the optical element 10. Curved surface 28B is located on the side close to base member 21, and is adjacent to thin metal film 22.

Reflective portion 20A is equivalent to the region in which each spherical member 28 is provided. Reflective portion 20B is equivalent to the region between the spherical members 28. Display light L entering reflective portion 20A is refracted on curved surface 28A, is reflected on curved surface 28B, and is refracted on curved surface 28A. As a result, reflective portion 20A retroreflects display light L. Reflective portion 20B specularly reflects display light L by flat thin metal film 22. When base member 21 is located inside the display device 1, thin metal film 22 covers the supporter layer 27 and the spherical members 28, and is not provided between the supporter layer 27 and the spherical members 28. In this case, curved surface 28A is adjacent to base member 21. Curved surface 28B is away from base member 21, and is adjacent to thin metal film 22.

Reflective element 20 may not comprise thin metal film 22. In this structure, the supporter layer 27 is preferably formed of a material having high photoreflectivity. Although not shown in the figure, reflective element 20 may comprise the overcoat layer 24 which covers thin metal film 22 and the spherical members 28.

In this modification example, similarly, when reflective element 20 is seen in plan view, the total area of reflective portions 20B is less than that of reflective portions 20A.

FIG. 13 is a cross-sectional view showing a third modification example of reflective element 20 shown in FIG. 7.

The third modification example is different from the structural example shown in FIG. 7 in respect that apex portion 20H comprises a reflective surface M7.

Apex portion 20H is a flat surface parallel to apex portion 20h. Apex portion 20h is located on the horizontal surface H. These apex portions 20H and 20h are formed by, for example, planarizing the convex portions of base member 21 by polishing, and providing thin metal film 22. Reflective surface M7 is formed on apex portion 20H. Reflective portions 20B comprise reflective surfaces M4 and M7. Reflective surfaces M1 to M3 of reflective portion 20A are located between reflective surface M4 and reflective surface M7. Thus, reflective portions 20A and 20B are alternately provided in the second direction D2.

In this modification example, when reflective element 20 is seen in plan view, the total area of reflective portions 20A is less than that of the structural example shown in FIG. 7. However, even in the present modification example, the total area of reflective portions 20B is less than that of reflective portions 20A.

Figure 14:
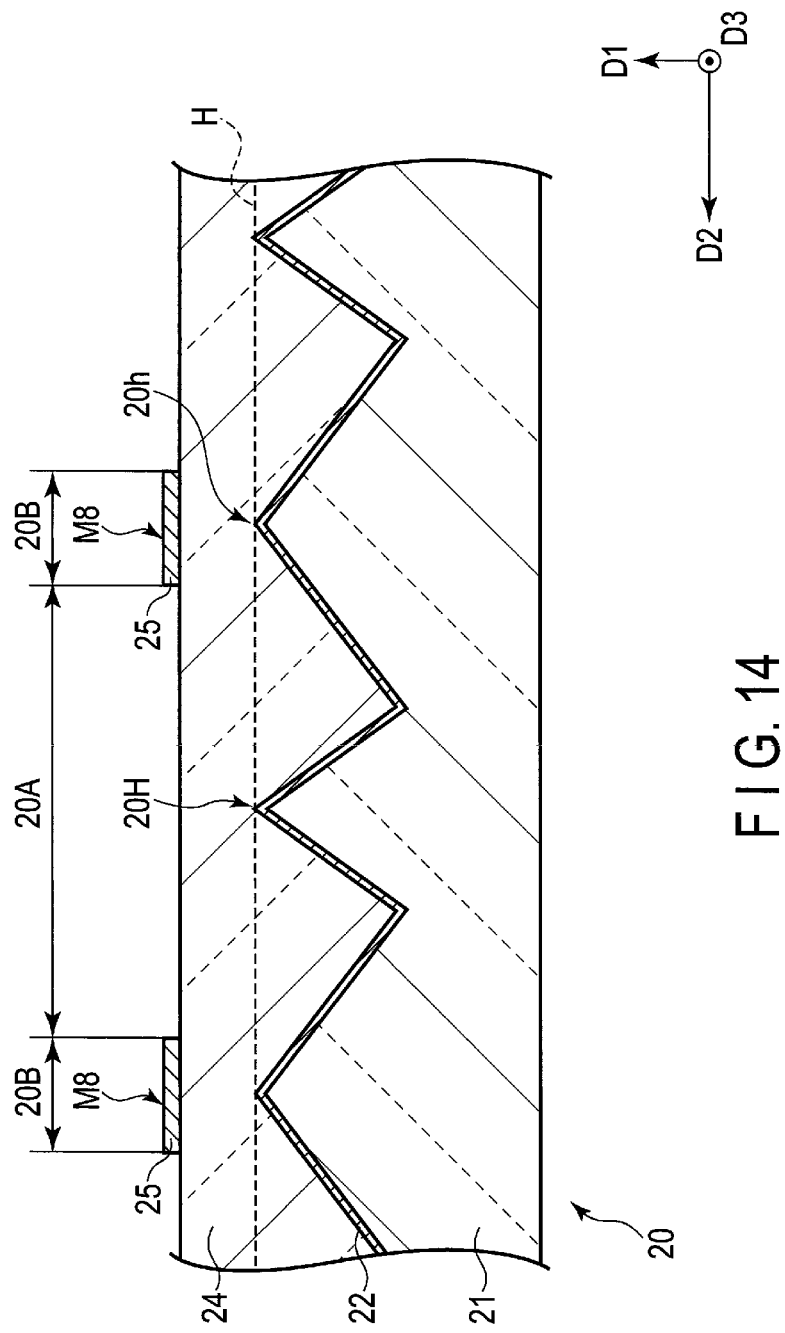
FIG. 14 is a cross-sectional view showing a fourth modification example of reflective element 20 shown in FIG. 7.

FIG. 14 is a cross-sectional view showing a fourth modification example of reflective element 20 shown in FIG. 7.

The fourth modification example is different from the structural example shown in FIG. 7 in respect that a reflective layer 25 is provided on the overcoat layer 24.

The reflective layer 25 is provided in regions corresponding to regions R1 to R3 which do not have retroreflectivity on the overcoat layer 24 on a side opposite to the side facing base member 21. The reflective layer 25 is formed by, for example, deposition using photoreflective metal. The reflective layer 25 comprises a reflective surface M8. Reflective portion 20B comprises reflective surface M8. At this time, the shape of apex portion 20h is not particularly limited. For example, apex portions 20H and 20h are located on the horizontal surface H.

FIG. 15 is a cross-sectional view showing a fifth modification example of reflective element 20 shown in FIG. 7.

The fifth modification example is different from the structural example shown in FIG. 14 in respect that the fifth modification example comprises an interlayer film 26.

The interlayer film 26 is located between the overcoat layer 24 and the reflective layer 25. The interlayer film 26 comprises an attachment layer 26A and a supporter layer 26B. The attachment layer 26A is provided on a side of the supporter layer 26B so as to face the overcoat layer 24. The reflective layer 25 is provided on a side of the supporter layer 26B opposite to the side facing the attachment layer 26A. This structure can be formed by patterning the reflective layer 25 on the interlayer film 26 and attaching the supporter layer 26B and the reflective layer 25 to the overcoat layer 24 via the attachment layer 26A.

Figure 16:
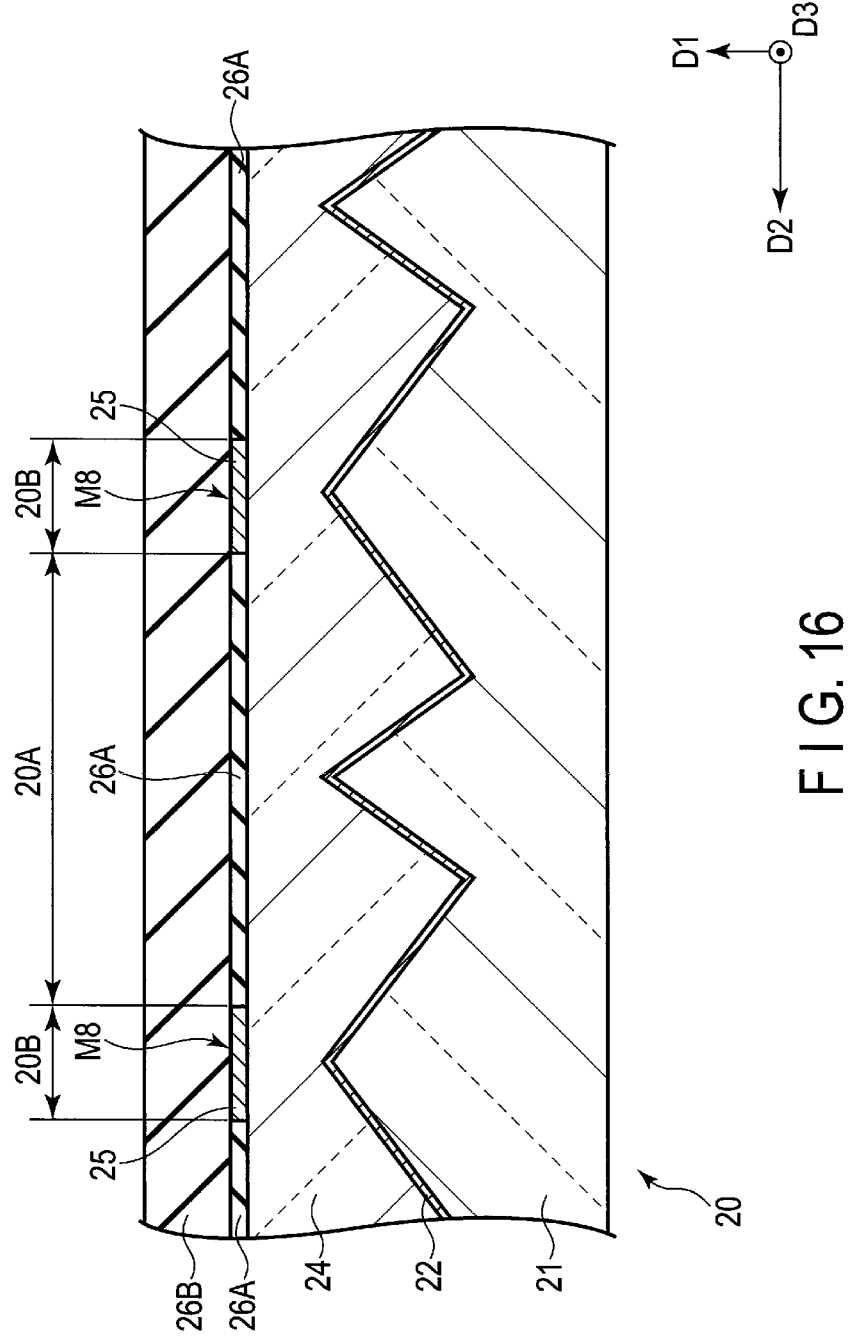
FIG. 16 is a cross-sectional view showing a sixth modification example of reflective element 20 shown in FIG. 7.

FIG. 16 is a cross-sectional view showing a sixth modification example of reflective element 20 shown in FIG. 7.

The sixth modification example is different from the structural example shown in FIG. 15 in respect that the reflective layer 25 is located between the supporter layer 26B and the overcoat layer 24.

This structure can be formed by patterning the reflective layer 25 on the supporter layer 26B and attaching the surface of the supporter layer 26B on which the reflective layer 25 is formed to the overcoat layer 24 with the attachment layer 26A. In this structure, damage of the reflective layer 25 can be prevented by the supporter layer 26B.

Figure 17:
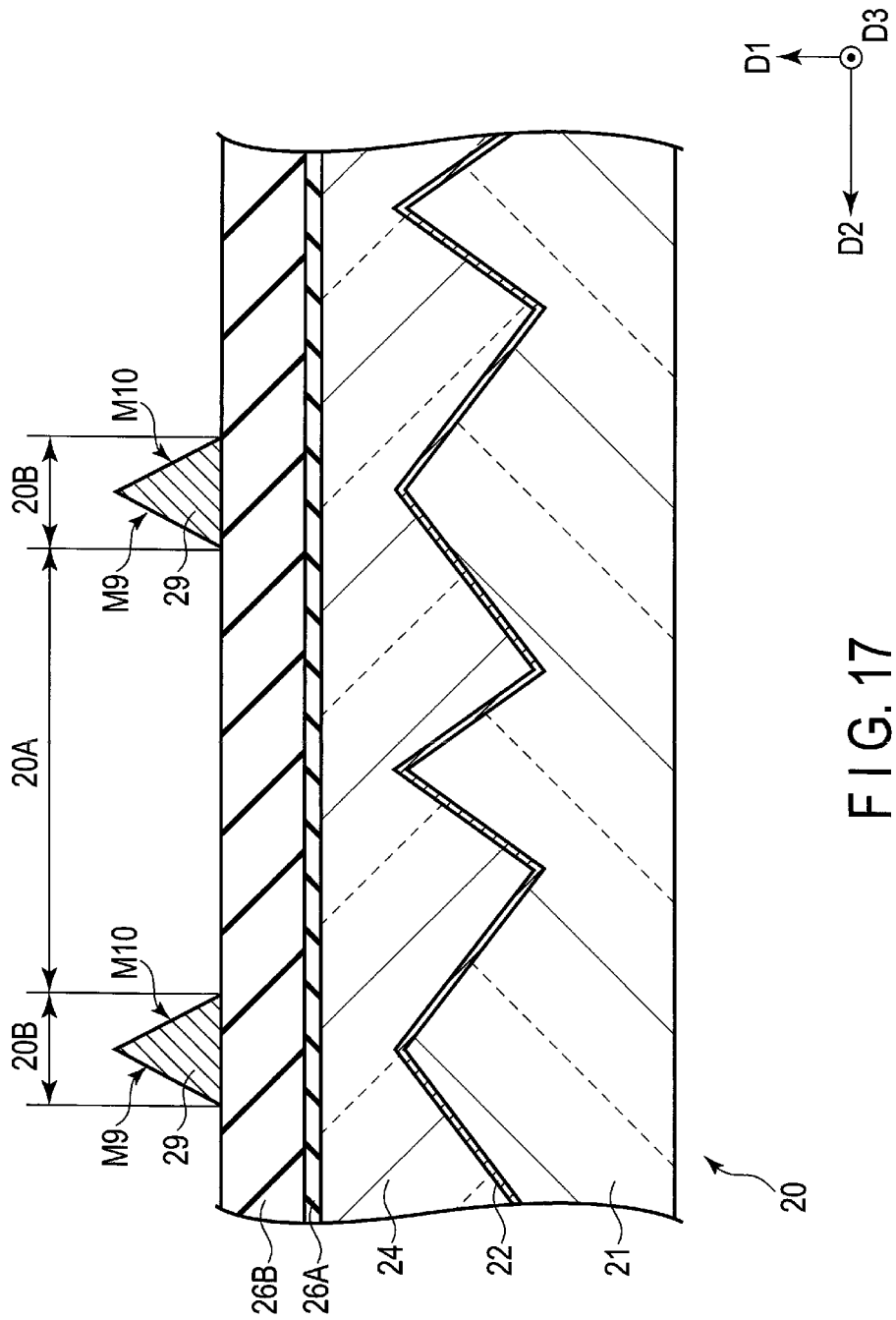
FIG. 17 is a cross-sectional view showing a seventh modification example of reflective element 20 shown in FIG. 7.

FIG. 17 is a cross-sectional view showing a seventh modification example of reflective element 20 shown in FIG. 7.

The seventh modification example is different from the structural example shown in FIG. 15 in respect that the seventh modification example comprises a projection 29 having photoreflectivity instead of the reflecting layer 25.

The projection 29 comprises reflective surfaces M9 and M10. Reflective portion 20B comprises reflective surfaces M9 and M10. In the example of FIG. 17, the cross-sectional shape of the projection 29 is an isosceles triangle. The isosceles triangle comprises a base on the interlayer film 26 side, and reflective surfaces M9 and M10 as two sides of equal length. In this structure, in a manner similar to that of FIG. 11, display light L having entered reflective portion 20B can be reflected toward reflective portion 20A. The extension direction of reflective surface M9 or M10 is not particularly limited. The length of reflective surface M9 may be different from that of reflective surface M10. For example, the cross-sectional shape of the projection 29 may be a right triangle comprising reflective surface M10 as a hypotenuse. Such a structural example is explained with reference to FIG. 18 below.

Figure 18:
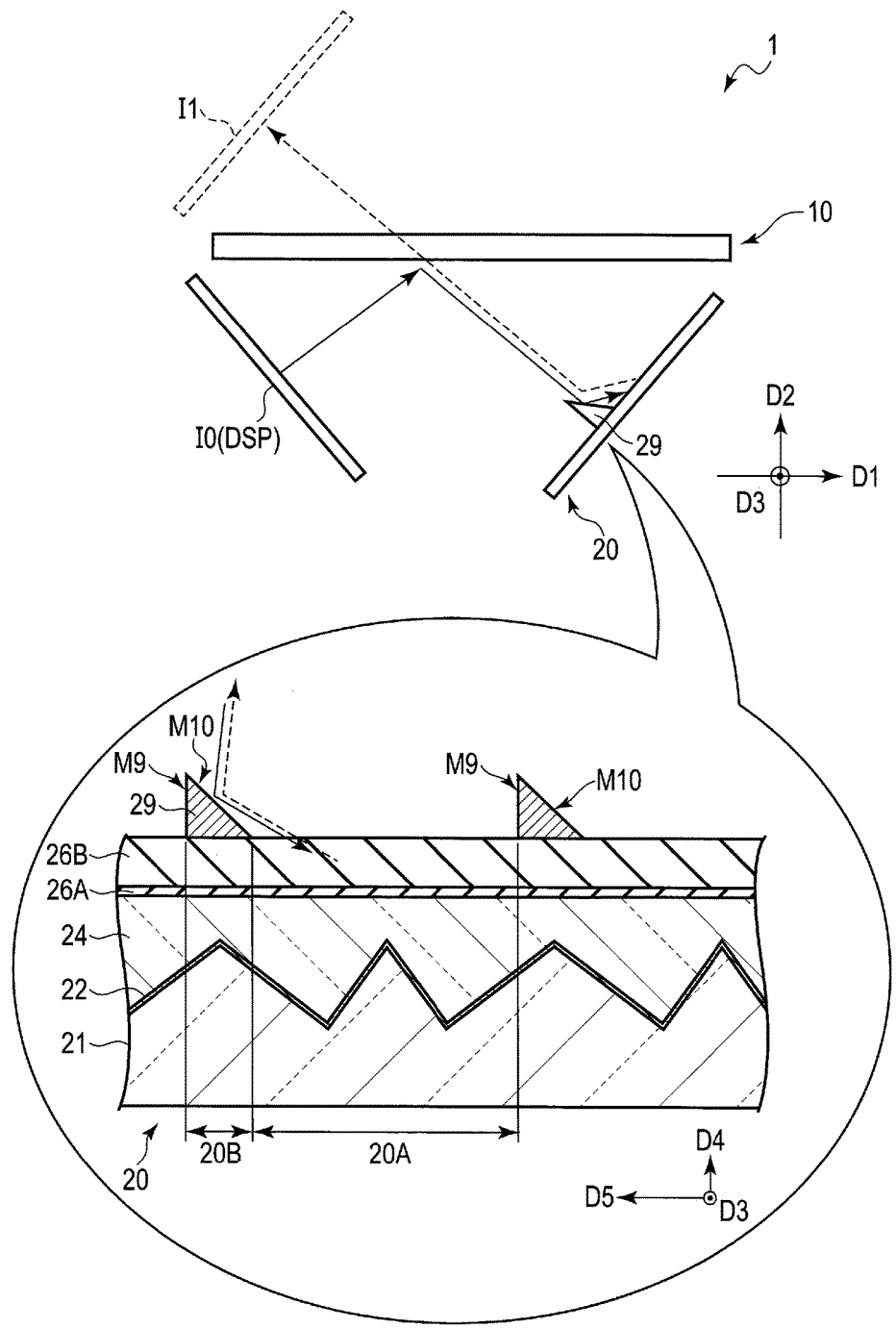
FIG. 18 shows a structural example of the display device 1 when it comprises reflective element 20 as a type of the seventh modification example shown in FIG. 17, and an example of the path of light.

FIG. 18 shows a structural example of the display device 1 when it comprises reflective element 20 as a type of the seventh modification example shown in FIG. 17, and an example of the path of light.

In the example of FIG. 18, the cross-sectional shape of the projection 29 is a triangle in which reflective surface M10 is longer than reflective surface M9 and the side adjacent to the interlayer film 26. Reflective surface M10 is provided on the optical element 10 side. When reflective element 20 is provided obliquely with respect to the optical element 10, the area facing reflective surface M10 can be increased in the optical element 10.

Now, this specification explains a modification example of the structural example shown in FIG. 1. When the optical element 10 comprises the reflective polarization element PL, the positions of the retardation films are not limited to the structural example shown in FIG. 1. A modification example of the positions of the retardation films is shown in FIG. 19.

Figure 19:
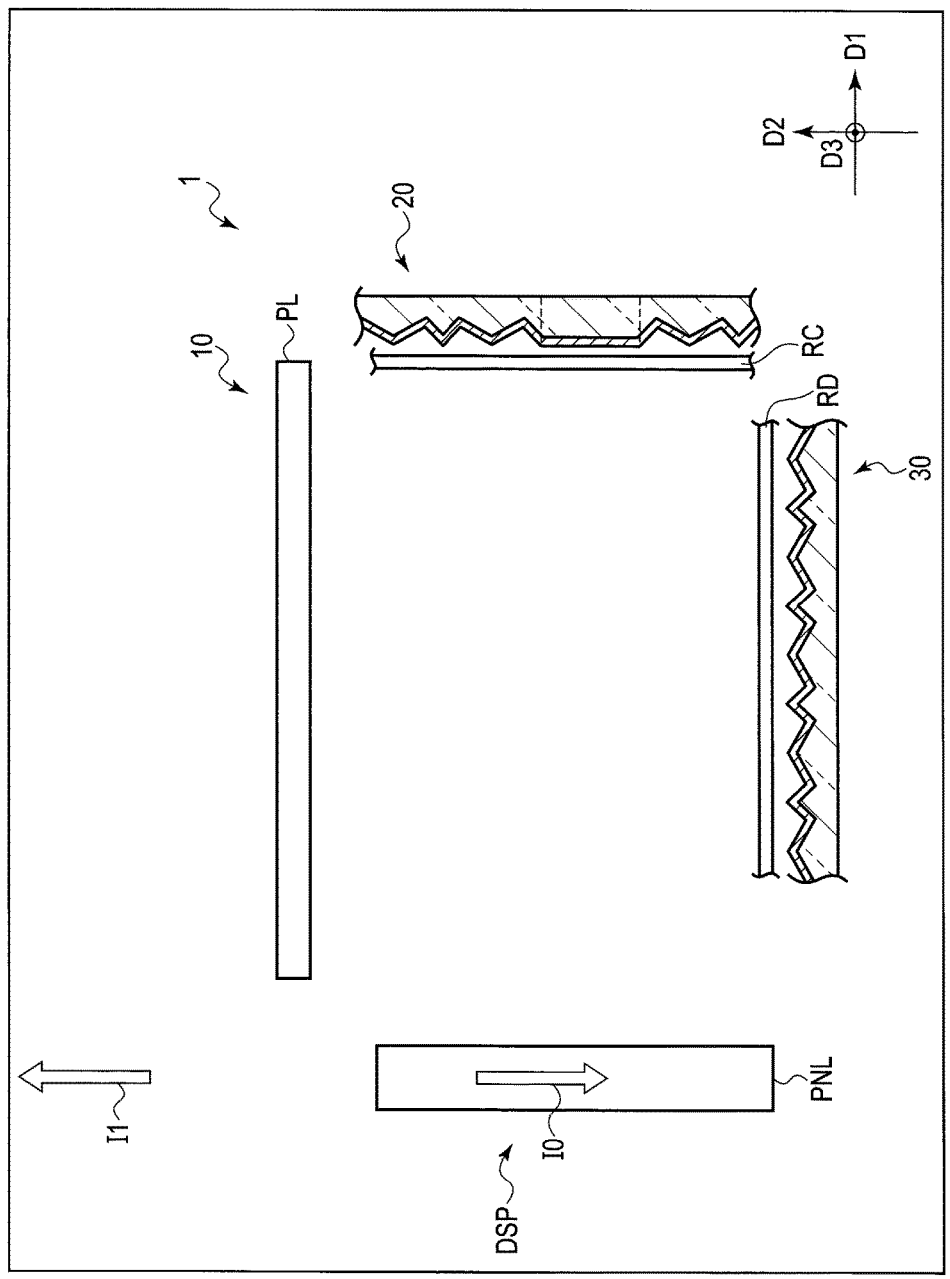
FIG. 19 shows a modification example of the display device 1 shown in FIG. 1.

FIG. 19 shows a modification example of the display device 1 shown in FIG. 1.

This modification example is different from the structural example shown in FIG. 1 in respect that the modification example comprises retardation films RC and RD instead of retardation films RA and RB.

Retardation film RC is provided in reflective element 20 so as to face the optical element 10. Retardation film RD is provided in reflective element 30 so as to face the optical element 10. The display portion DSP emits the second linearly polarized light. When display light L enters reflective portion 20A in this structure, the path of display light L is as follows. The second linearly polarized light emitted from the display portion DSP is reflected on the polarization element PL. When the light passes through retardation film RC, the light is converted into circularly polarized light. Subsequently, the light is retroreflected on reflective element 20. When the light passes through retardation film RC, the light is converted into the first linearly polarized light. The light passes through the polarization element PL and forms display image I1. When display light L enters reflective portion 20B, the path of display light L is as follows. The second linearly polarized light emitted from the display portion DSP is reflected on the polarization element PL. When the light passes through retardation film RC, the light is converted into circularly polarized light. The light is specularly reflected on reflective element 20. When the light passes through retardation film RC, the light is converted into the first linearly polarized light. When the light passes through retardation film RD, the light is converted into circularly polarized light. The light is retroreflected on reflective element 30. When the light passes through retardation film RD, the light is converted into the second linearly polarized light. When the light passes through retardation film RC, the light is converted into circularly polarized light. Subsequently, the light is specularly reflected on reflective element 20. When the light passes through retardation film RC, the light is converted into the first linearly polarized light. Subsequently, the light passes through the polarization element PL and forms display image I1.

Figure 20:
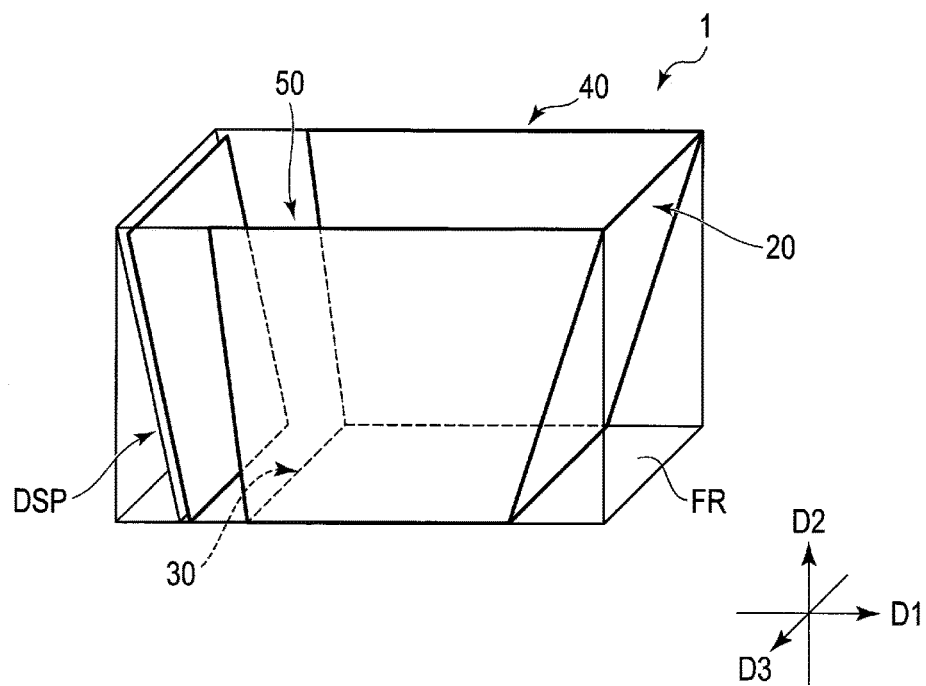
FIG. 20 shows an example of the layout of a display portion DSP and reflective elements 20, 30, 40 and 50.
Figure 21:
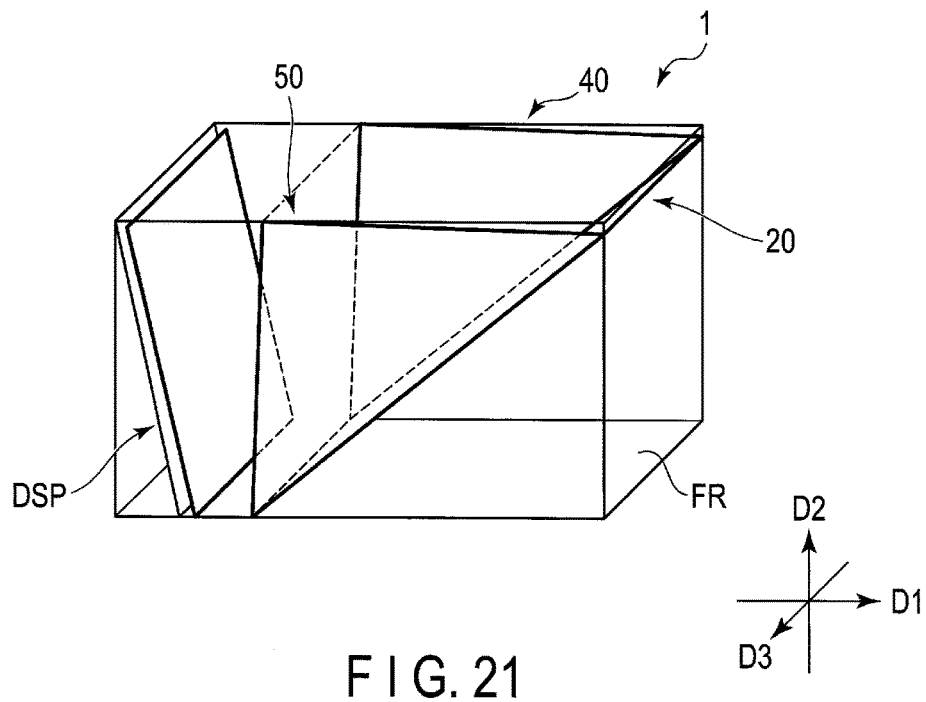
FIG. 21 shows an example of the layout of the display portion DSP and reflective elements 20, 40 and 50.

Now, this specification explains some layout examples when the display device 1 is provided inside a housing FR. The housing FR shown in FIG. 20 and FIG. 21 is cubic. However, the shape of the housing FR is not limited to this example, and may be a different shape such as a cylinder.

FIG. 20 shows an example of the layout of the display portion DSP and reflective elements 20, 30, 40 and 50. FIG. 21 shows an example of the layout of the display portion DSP and reflective elements 20, 40 and 50.

FIG. 20 shows a layout example when reflective element 30 is provided in the bottom portion of the housing FR. FIG. 21 shows a layout example when reflective element 30 is not provided.

In either case, the display portion DSP and reflective element 20 are provided on respective opposite side surfaces of the housing FR. On the other respective opposite side surfaces, reflective elements 40 and 50 are provided. Reflective elements 40 and 50 preferably have the same structure as reflective element 20. In these layout examples, display light L which is emitted from the display portion DSP, is reflected on the optical element 10, and is even reflected toward reflective elements 40 and 50 can contribute to formation of display image I1.

Figure 22:
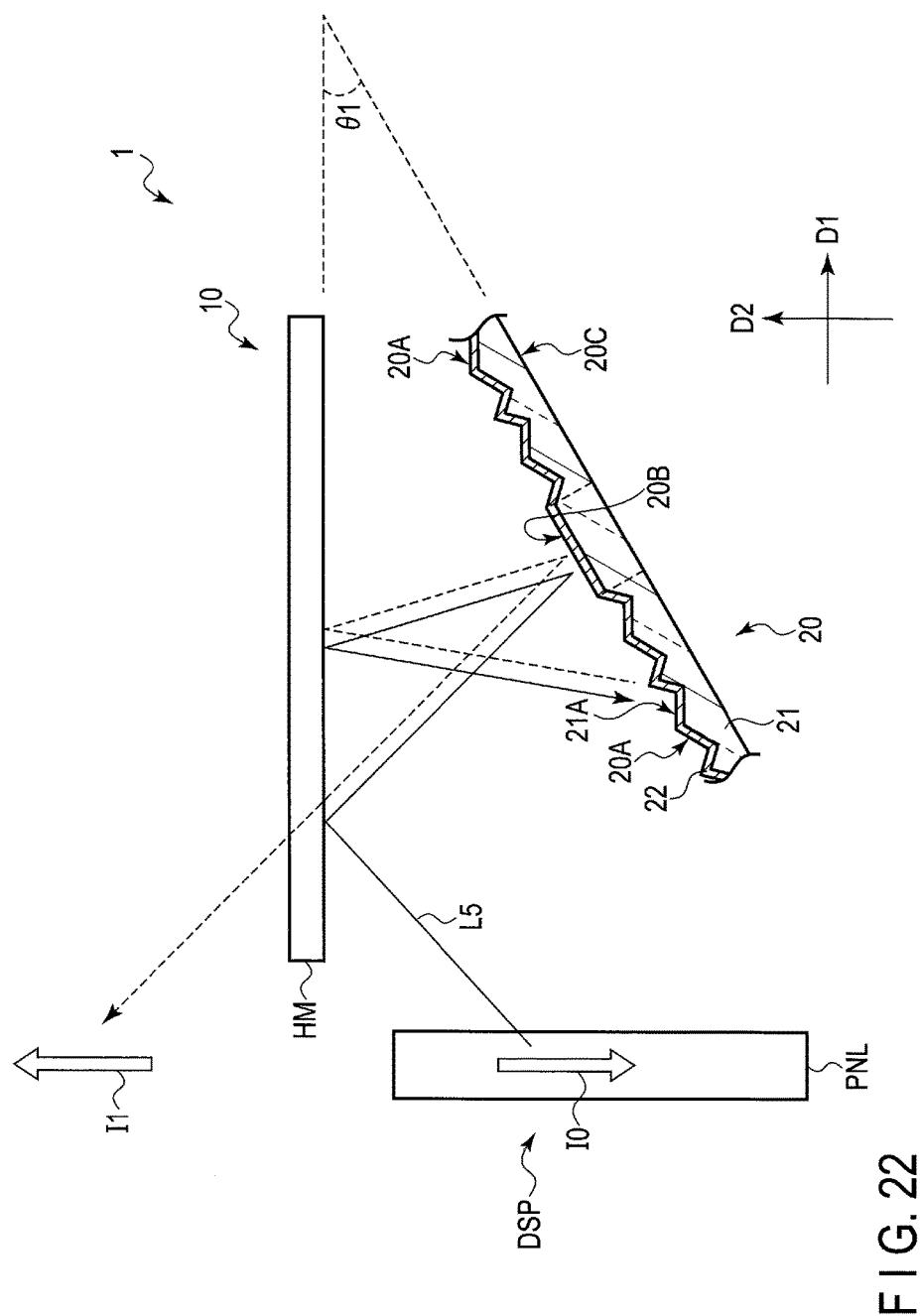
FIG. 22 shows an example of the path of display light L in the layout example shown in FIG. 21.

FIG. 22 shows an example of the path of display light L in the layout example shown in FIG. 21. The optical element 10 comprises a beam splitter HM which partially transmits and reflects incident light. Angle θ1 between reflective element 20 and the optical element 10 is an acute angle. The other structures are the same as those of FIG. 1, detailed description thereof being omitted. In the example of FIG. 22, the display portion DSP does not comprise a retardation film in the display panel PNL on the side facing the optical element 10. However, the display portion DSP may comprise retardation film RB.

The beam splitter HM is, for example, a half mirror. Reflective element 20 faces the display portion DSP in the first direction D1, and faces the optical element 10 in the second direction D2. Angle θ1 is equivalent to the angle between rear surface 20C of reflective element 20 and the surface of the beam splitter HM.

Display light L5 displaying display image I0 is emitted from the display portion DSP, is reflected on the optical element 10, is specularly reflected on reflective portion 20B, is reflected on the optical element 10, is retroreflected on reflective portion 20A, is reflected on the optical element 10 again, and is specularly reflected on reflective portion 20B. Subsequently, display light L5 passes through the optical element 10 and forms display image I1.

The path of display light L5 is as explained above. Thus, angle θ1 is the angle at which at least part of display light L reflected on reflective portion 20B enters the optical element 10. Further, angle θ1 is the angle at which at least part of display light L reflected on reflective portion 20B enters reflective portion 20A after reflection on the optical element 10. To improve the proportion of display light which contributes to formation of display image I1, angle θ1 is preferably greater than 0° and less than 90°. For example, angle θ1 is less than or equal to 45°.

As explained above, the present embodiment can provide a display device which prevents degradation of display quality.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
a display module emitting light;
an optical element urging incident light emitted from a light source to be transmitted or reflected; and
a first reflective element comprising a first reflective portion on which the light reflected on the optical element is retroreflected, and a second reflective portion on which the light reflected on the optical element is specularly reflected, wherein
the second reflective portion has an area less than area of the first reflective portion, is surrounded by the first reflective portion, and is provided in a zigzag pattern.

2. The device of claim 1, further comprising
a second reflective element on which the light specularly reflected on the first reflective element is retroreflected.

3. The device of claim 1, wherein
the first reflective element makes an acute angle with the optical element.

4. The device of claim 1, wherein
the first reflective portion radially extends from a center, and comprises first to third reflective surfaces intersecting each other,
the second reflective portion is provided in first to third regions adjacent to a region in which the first reflective portion is located in plan view,
the first region is adjacent to the first and second reflective surfaces and is isolated from the center in plan view,
the second region is adjacent to the second and third reflective surfaces and is isolated from the center in plan view, and
the third region is adjacent to the third and first reflective surfaces and is isolated from the center in plan view.

5. The device of claim 4, wherein
the second reflective portion comprises a flat surface in each of the first to third regions.

6. The device of claim 4, wherein
the second reflective portion comprises a projecting portion which projects to a side away from the center.

7. The device of claim 1, wherein
the first reflective portion comprises a phototransmissive spherical member, and the spherical member comprises:
    a first curved surface on which the reflective light is refracted; and
    a second curved surface on which the reflective light is reflected,
    the first curved surface is located on a side close to the optical element, and
    the second curved surface is located on a side away from the optical element.

8. A display device comprising:
a display module emitting light;
an optical element urging incident light emitted from a light source to be transmitted or reflected; and
a first reflective element comprising a first reflective portion in an uneven surface on which the reflective light reflected on the optical element is retroreflected, a second reflective portion on which the reflective light is specularly reflected, and a first plane opposed to the first reflective portion and the second reflective portion, wherein
the first reflective portion comprises first, second and third reflective surfaces being in contact with each other at a central point,
the first reflective surface is adjacent to the second and third reflective surfaces,
the second reflective surface is adjacent to the first and third reflective surfaces,
the third reflective surface is adjacent to the second and first reflective surfaces,
the second reflective portion is provided in first, second and third regions comprising a flat surface parallel to the first plane,
the first region is adjacent to the first and second reflective surfaces,
the second region is adjacent to the second and third reflective surfaces, and
the third region is adjacent to the third and first reflective surfaces.

9. The device of claim 8, wherein
the first reflective portion is depressed toward the central point.

10. The device of claim 8, wherein
the first region, the second region and the third region are isolated from each other.

11. The device of claim 8, further comprising:
a second reflective element on which the light specularly reflected on the first reflective element is retroreflected toward the first reflective element.

12. The device of claim 8, wherein
the first reflective portion comprises a phototransmissive spherical member, and
the spherical member comprises:
    a first curved surface on which the reflective light is refracted; and
    a second curved surface on which the reflective light is reflected,
    the first curved surface is located on a side close to the optical element, and
    the second curved surface is located on a side away from the optical element.

13. The device of claim 8, wherein
a total area of the first, second and third regions is less than a total area of the first, second and third reflective surfaces in plan view.

14. A display device comprising:
a display module emitting light;
an optical element urging incident light emitted from a light source to be transmitted or reflected; and
a first reflective element comprising a first reflective portion on which the reflective light reflected on the optical element is retroreflected, and a second reflective portion on which the reflective light is specularly reflected, wherein
the first reflective portion comprises first, second and third reflective surfaces being in contact with each other at a central point,
the first reflective surface is adjacent to the second and third reflective surfaces,
the second reflective surface is adjacent to the first and third reflective surfaces,
the third reflective surface is adjacent to the second and first reflective surfaces,
the second reflective portion is provided in projecting first, second and third regions,
the first region is adjacent to the first and second reflective surfaces,
the second region is adjacent to the second and third reflective surfaces, and
the third region is adjacent to the third and first reflective surfaces.

15. The device of claim 14, wherein
the first reflective portion is depressed toward the central point.

16. The device of claim 15, wherein
the first, second and third regions project in a direction opposite to a direction in which the first reflective portion is depressed.

17. The device of claim 14, further comprising:
a second reflective element on which the light specularly reflected on the first reflective element is retroreflected toward the first reflective element.

18. The device of claim 14, wherein
the first reflective portion comprises a phototransmissive spherical member, and
the spherical member comprises:
    a first curved surface on which the reflective light is refracted; and
    a second curved surface on which the reflective light is reflected,
    the first curved surface is located on a side close to the optical element, and
    the second curved surface is located on a side away from the optical element.

19. The device of claim 14, wherein
a total area of the first, second and third regions is less than a total area of the first, second and third reflective surfaces in plan view.

* * * * *